(12) United States Patent
Nakagawa et al.

(10) Patent No.: US 11,612,963 B2
(45) Date of Patent: Mar. 28, 2023

(54) LASER CUTTING DEVICE INCLUDING MACHINING CONDITION TABLES AND LASER CUTTING METHOD THEREOF

(71) Applicant: Panasonic Intellectual Property Management Co., Ltd., Osaka (JP)

(72) Inventors: Tatsuyuki Nakagawa, Osaka (JP); Futoshi Tsutsumi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 436 days.

(21) Appl. No.: 16/856,124

(22) Filed: Apr. 23, 2020

(65) Prior Publication Data

US 2020/0246920 A1   Aug. 6, 2020

Related U.S. Application Data

(63) Continuation of application No. PCT/JP2019/009553, filed on Mar. 11, 2019.

(30) Foreign Application Priority Data

Mar. 26, 2018   (JP) .............................. JP2018-058624

(51) Int. Cl.
  *B23K 26/38*   (2014.01)
  *B23Q 15/08*   (2006.01)
  (Continued)

(52) U.S. Cl.
  CPC .............. *B23K 26/38* (2013.01); *B23Q 15/08* (2013.01); *B23Q 17/0947* (2013.01); *B23Q 17/10* (2013.01); *B23Q 17/20* (2013.01)

(58) Field of Classification Search
  CPC .... B23K 26/38; B23K 26/0884; B23Q 15/08; B23Q 17/0947; B23Q 17/10; B23Q 17/20;
  (Continued)

(56) References Cited

U.S. PATENT DOCUMENTS 9,317,031 B2 * 4/2016 Hammann ....... G05B 19/40937
9,839,975 B2 * 12/2017 Beutler .................. B23K 26/03
(Continued)

FOREIGN PATENT DOCUMENTS

CN   105705289   6/2016
DE   10 2016 111 455   12/2017
(Continued)

OTHER PUBLICATIONS

Extended European Search Report dated Apr. 29, 2021 in European Patent Application No. 19775420.3.
(Continued)

*Primary Examiner* — John P. Dulka

(74) *Attorney, Agent, or Firm* — Wenderoth, Lind & Ponack, L.L.P.

(57) ABSTRACT

A laser cutting device includes a control unit configured to control operations of a laser machining robot and a laser oscillator. Machining condition tables are stored in memory of the control unit. Each of the machining condition tables
(Continued)

includes data of a laser power output and a duty, a usable range of a cutting speed of cutting a workpiece, the usable range being set based on a speed range in which a laser cutting robot can move with given tracking accuracy, and an effective range of the cutting speed and the laser power output that are set so that a cut surface of the workpiece meets given finishing conditions. The control unit is configured to select one of the machining condition tables so that the cutting speed and the laser power output meet given conditions, and control cutting of the workpiece based on the selected machining condition table.

9 Claims, 14 Drawing Sheets

(51) Int. Cl.
*B23Q 17/09* (2006.01)
*B23Q 17/10* (2006.01)
*B23Q 17/20* (2006.01)

(58) Field of Classification Search
CPC ........... G05B 2219/33109; G05B 2219/36199; G05B 2219/45041; G05B 2219/45165; B25J 9/1656
See application file for complete search history.

(56) References Cited

U.S. PATENT DOCUMENTS

| | | |
|---|---|---|
| 2007/0177128 A1 | 8/2007 | Ando et al. |
| 2014/0054274 A1* | 2/2014 | Chagnot ................ B23K 26/14 219/121.72 |
| 2016/0207142 A1 | 7/2016 | Kawamoto et al. |
| 2019/0111516 A1 | 4/2019 | Meyer |

FOREIGN PATENT DOCUMENTS

| | | | |
|---|---|---|---|
| EP | 0 600 098 | 6/1994 | |
| EP | 600098 A1 * | 6/1994 | ........... B23K 26/123 |
| JP | 3-161185 | 7/1991 | |
| JP | 4-080802 | 3/1992 | |
| JP | 4-135084 | 5/1992 | |
| JP | 2001-087862 | 4/2001 | |
| JP | 2002-273582 | 9/2002 | |
| JP | 2004-174586 | 6/2004 | |
| JP | 2007-203346 | 8/2007 | |
| JP | 2008-290135 | 12/2008 | |
| WO | 2015/072107 | 5/2015 | |

OTHER PUBLICATIONS

International Search Report of PCT application No. PCT/JP2019/009553 dated Jun. 4, 2019.
English Translation of Chinese Search Report dated Mar. 11, 2021 for the related Chinese Patent Application No. 201980004350.6.
English Translation of Search Report dated Sep. 27, 2021 in Chinese Patent Application No. 201980004350.6.

* cited by examiner

| CUTTING TRACK | CIRCLE | OVAL | RECTANGLE (SQUARE) |
|---|---|---|---|
| SET CUTTING SPEED UPPER LIMIT VALUE | VC | VO | VR |

MACHINING CONDITION TABLE No. 1M (M DENOTES INTEGER OF 1 OR LARGER) ......... No.21 ... No.NM

MACHINING CONDITION TABLE No. 11

PLATE THICKNESS: 6 mm
PLATE THICKNESS: 2 mm

BASIC CONDITIONS
MATERIAL: SUS304
PLATE THICKNESS: 1.0 mm
ASSIST GAS TYPE: N2
(HEAD TILT ANGLE: 0°)
(CUTTING SHAPE: CIRCLE)

MACHINING CONDITION GROUP 1
FOCUS POSITION: ...
DISTANCE BETWEEN LASER MACHINING HEAD AND WORK: ...
ASSIST GAS PRESSURE: ...
ASSIST GAS DISCHARGE DIAMETER: ...

MACHINING CONDITION GROUP 2
LASER OSCILLATION FREQUENCY: ...
LASER POWER OUTPUT DUTY: ...

MACHINING CONDITION GROUP 3
CUTTING SPEED: ...
LASER POWER OUTPUT: ...

MACHINING CONDITION TABLE No. 1a

CONDENSING LENS TYPE: 1 (E.G., SPHERICAL LENS WITH LENS DIAMETER OF 4 mm ...)

CONDENSING LENS TYPE: 2-N (N DENOTES INTEGER OF 2 OR LARGER)

110

LASER CUTTING DEVICE INCLUDING MACHINING CONDITION TABLES AND LASER CUTTING METHOD THEREOF

TECHNICAL FIELD

The present invention relates to a laser cutting device and a laser cutting method.

BACKGROUND ART

Laser cutting is performed in a wide range of fields to cut works made of various materials and having different thicknesses. In laser cutting, a cutting speed and a laser power output are set first and then an actual cutting process is carried out. In this case, the cutting speed is set by, for example, fixing a position of a laser machining head and then adjusting a feeding speed of a work. However, an actual work has a bent part or corner along which a cutting direction, i.e., a work feeding direction is changed. In adjustment to this change in the cutting direction, therefore, the cutting speed needs to be increased or decreased.

For example, Unexamined Japanese Patent Publication No. 2007-203346 discloses a laser control method by which when a work is machined along a machining path specified by a machining program, an actual feeding speed, which is a relative feeding speed of the work relative to a laser beam, is detected and laser power output conditions corresponding to the detected actual feeding speed are determined. According to this laser control method, to determine the laser power output conditions corresponding to the actual feeding speed, a machining condition table in which a plurality of feeding speeds different from each other are associated with laser power output conditions is stored in a controller.

SUMMARY OF THE INVENTION

Technical Problem

In recent years, to cut a work of a complicated shape, a laser cutting method using a laser machining robot having a laser machining head connected to a front end of a manipulator is used in many cases. This method is carried out in many cases such that when a work is fixed to a stationary position, the laser machining robot is actuated to emit a laser beam onto a given track to cut the work.

When a work of a shape having irregularities on a part of its surface is cut, however, a tilt angle of the laser machining head needs to be changed widely in conformity to the work's surface shape carrying the irregularities. In such a case, a plurality of drive shafts of the laser machining robot are operated in a coordinated manner. This process leads to a tendency that a track of movement of the laser machining head deviates from a prescribed track. To avoid such a situation, therefore, the laser machining head needs to be moved at low speed. On a flat surface, on the other hand, the laser machining head should preferably be moved at high speed in order to reduce a time required for a cutting process. As in the above case where setting of a movement speed of the laser machining head is changed at each teaching point on a cutting track, when machining condition changes are frequent, a need of changing other machining conditions in accordance with such machining condition changes arises, which makes machining condition setting troublesome.

The present invention has been conceived in view of the above problems, and it is therefore an object of the invention to provide a laser cutting device and a laser cutting method that allow cutting conditions to be set easily.

Solution to Problems

In order to achieve the above object, a laser cutting device according to the present invention is provided as a laser cutting device that cut a work by emitting a laser beam output from a laser oscillator onto the work via a transmission fiber and a laser machining head fitted to a front end of a laser machining robot, the laser cutting device including a control unit that controls operations of the laser machining robot and the laser oscillator. The laser machining robot has a predetermined speed range in which the laser machining robot is allowed to move with a given tracking accuracy, and a usable range of a cutting speed of cutting the work is set based on the speed range. The control unit includes a memory storing a plurality of machining condition tables carrying data on cutting conditions. Each of the machining condition tables includes, as parameters associated with a material and a plate thickness of the work, at least a laser oscillation frequency, a laser power output, a laser power output duty, the usable range of the cutting speed, an effective range demarcated by the cutting speed and the laser power output that are set so that a cut surface of the work meets given finishing conditions, and an approximation of a lower boundary of the effective range. The control unit selects a machining condition table from the plurality of machining condition tables stored in the memory so that the work cutting speed and the laser power output meet given conditions, and controls operations of the laser machining robot and the laser oscillator so that the work is cut based on the selected machining condition table.

According to this configuration, a machining condition table is selected from a machining condition table group, which is acquired in advance, so that given conditions required for a cutting speed and a laser power output are met. This allows laser cutting conditions to be set easily.

A laser cutting method according to the present invention is provided as a laser cutting method of cutting a work by emitting a laser beam output from a laser oscillator onto the work, the laser oscillator being controlled in operation by a control unit, via a transmission fiber and a laser machining head fitted to a front end of a laser machining robot controlled in operation by the control unit. The laser cutting method include: a basic condition input step of receiving input of basic conditions applied at execution of laser cutting, the basic conditions including a material and a plate thickness of the work; a machining condition table selecting step of checking the basic conditions input at the basic condition input step against a machining condition table group stored in a memory included in the control unit, the machining condition table group including a plurality of machining condition tables carrying various parameters on laser cutting, to select a machining condition table corresponding to laser cutting of a desired form; a machining condition setting step of setting machining conditions for laser cutting, based on the machining condition table selected at the machining condition table selecting step; a cutting speed judging step of judging whether a cutting speed of cutting the work meets given conditions under the machining conditions set at the machining condition setting step; and a cutting step of controlling operations of the laser machining robot and the laser oscillator to cut the work based on a result of a judgment made at the cutting speed judging step.

According to this method, basic conditions including a material and a plate thickness of a work are checked against a machining condition table group acquired in advance, and cutting is performed based on given conditions required for a cutting speed. Thus, stable machining conditions with a wide operation margin are set easily, and laser cutting of a work can be performed under such machining conditions.

Advantageous Effect of Invention

As descried above, according to the laser cutting device of the present invention, laser cutting conditions can be set easily. According to the laser cutting method of the present invention, stable machining conditions with a wide operation margin are set easily, and laser cutting of a work can be performed under such machining conditions.

BRIEF DESCRIPTION OF DRAWINGS

FIG. 6 is a conceptual view showing a state of storage of machining condition tables in a memory.

DESCRIPTION OF EMBODIMENTS

Exemplary embodiments will now be described in detail with reference to the drawings. The following description of preferred exemplary embodiments is merely illustrative in nature and is not intended at all to limit the present invention, applications thereof, or use thereof.

First Exemplary Embodiment

[Configuration of Laser Cutting Device]

Figure 1:
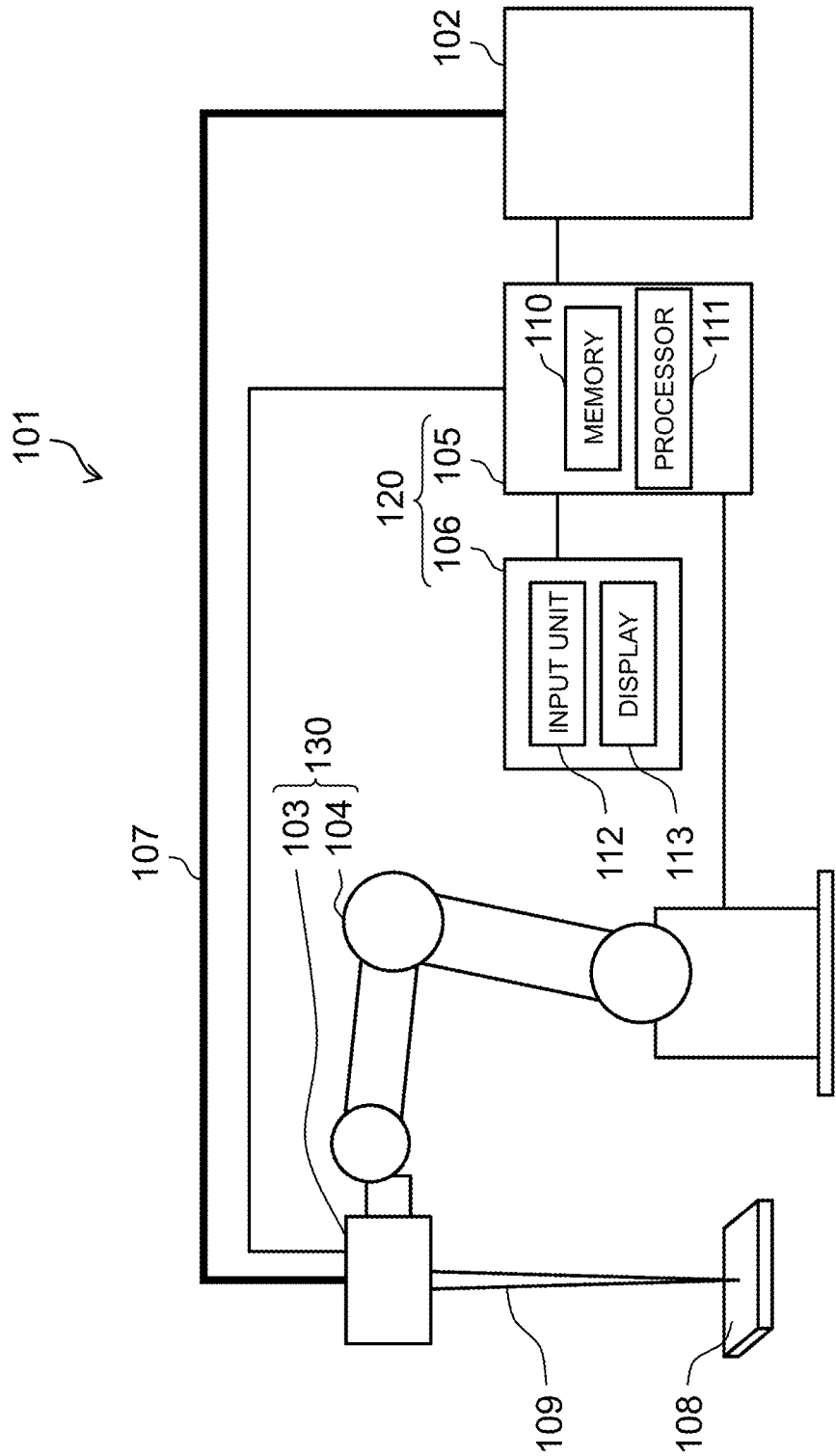
FIG. 1 is a diagrammatical view showing a configuration of a laser cutting device according to a first exemplary embodiment of the present invention.

FIG. 1 is a diagrammatical view showing a configuration of laser cutting device 101 according to a first exemplary embodiment. As shown in FIG. 1, laser cutting device 101 includes laser oscillator 102, laser machining robot 130, controller 105, and cutting condition setting device (teaching pendant) 106. Laser machining robot 130 has laser machining head 103 and manipulator 104.

Laser oscillator 102 is connected to laser machining head 103 through transmission fiber 107. Laser oscillator 102 oscillates to generate laser beam 109, and outputs generated laser beam 109 to laser machining head 103 through transmission fiber 107.

Laser machining head 103 emits incoming laser beam 109 from transmission fiber 107, toward work 108. In other words, laser beam 109 is emitted from a front end of laser machining head 103 onto work 108. Laser machining head 103 is provided with a connector to which transmission fiber 107 is connected, the connector being not depicted in FIG. 1. Inside laser machining head 103, condensing lens (not depicted) and other optical systems (not depicted) are arranged, the condensing lens condensing incoming laser beam 109 from transmission fiber 107 into laser beam 109 with a given spot diameter.

Manipulator 104 has a plurality of articulated shafts, each of which is fitted with a motor (not depicted) and an encoder (not depicted) that are connected to controller 105, which will be described later. Following an instruction from controller 105, laser machining robot 130 causes the motor fitted to each articulated shaft of manipulator 104 to rotate, thereby causing laser machining head 103 fitted to a front end of laser machining robot 130 to move in such a way as to draw a desired track. Manipulator 104 may not be an articulated type manipulator but may be a parallel link type manipulator.

Controller 105 is connected to manipulator 104, and controls operations of manipulator 104. Controller 105 is connected also to a drive component (not depicted) fitted to laser machining head 103, and controls operations of laser machining head 103. Controller 105 thus controls operations of laser machining robot 130. Controller 105 is connected also to laser oscillator 102, and controls an oscillation power output (which may be simply referred to as "laser power output" in the following description), an oscillation frequency, and a laser beam power output duty (which may be simply referred to as "laser power output duty" in the following description) of laser oscillator 102. Controller 105 is connected also to cutting condition setting device 106, and carries out two-way data communication with cutting condition setting device 106. Controller 105 has memory 110 storing therein a plurality of cutting conditions recorded in table formats, and processor 111 that sets and calculates desired cutting conditions according to a machining condition table stored in memory 110 and given input made by an operator. Memory 110 may be outside controller 105. In a case where memory 110 carries out two-way wired or wireless data communication with controller 105, for example, memory 110 may be on an external server or provided as an external memory medium.

Cutting condition setting device (teaching pendant) 106 has input unit 112 on which given data on cutting is input, and display 113 that displays cutting conditions, information sent from various sensors (not depicted) at execution of cutting, or the like. Controller 105 and cutting condition setting device 106 may be integrated into a single unit. In other words, when data exchange between controller 105 and cutting condition setting device 106 is ensured, in what way controller 105 and cutting condition setting device 106 are packaged is not an issue. A separate display different from display 113 may be connected to controller 105. A form of data input on input unit 112 is not limited to a specific form. Specifically, forms of data input on input unit 112 include data input using a keyboard, a touch panel, or the like, data input by voice and the like, and data input through an interface or the like used to send data from a memory medium or external server to memory 110. Cutting condition setting device 106 may be provided with a separate processor (not depicted) different from processor 111 so that the separate processor is caused to execute a given calculation process according to input made on input unit 112. In such a case, a result of the calculation process can be stored in memory 110. In the following description, controller 105 and cutting condition setting device 106 may be collectively referred to as "control unit 120". In this exemplary embodiment, a maximum power output of laser oscillator 102 is determined to be 4 kW. The maximum power output of laser oscillator 102 is, however, not limited to 4 kW but may be changed when necessary, depending on a type of work 108 or the like.

[Procedure for Creating a Machining Condition Table]

Figure 2:
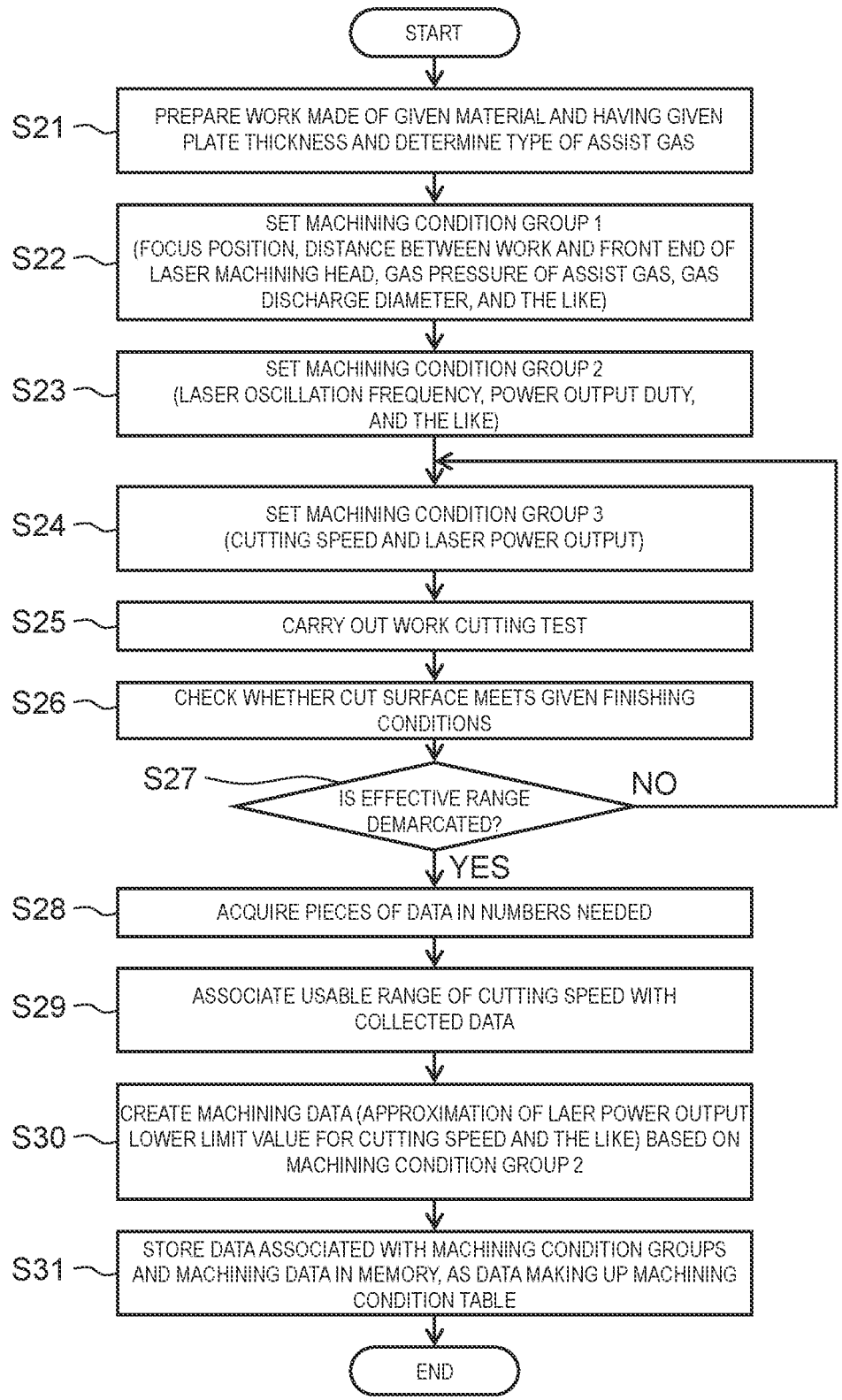
FIG. 2 is a flowchart of a data collection procedure for creating a machining condition table.
Figure 3:
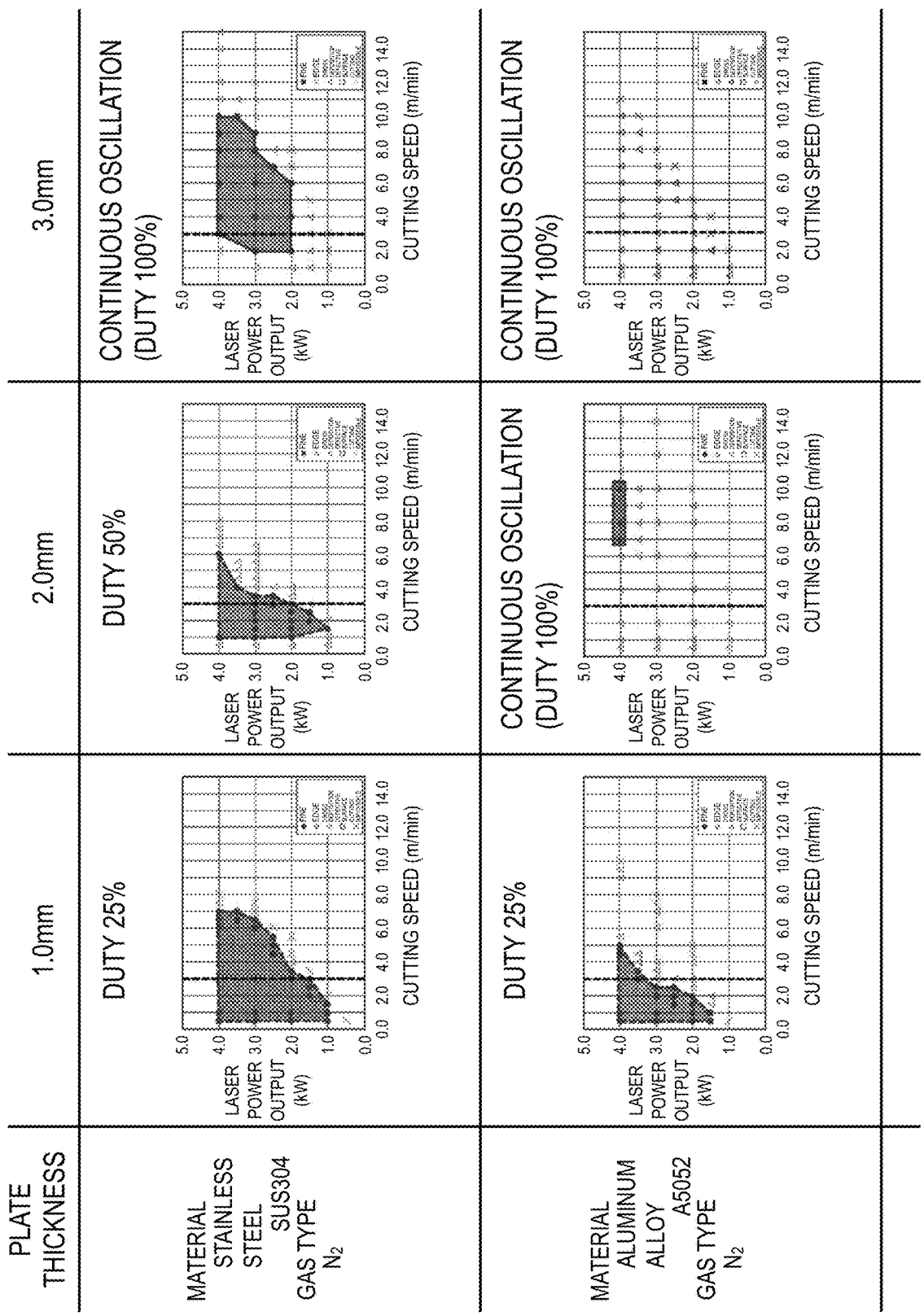
FIG. 3 depicts graphs each indicating a range of a cutting speed of cutting a work and a laser power output, the cutting speed and laser power output being adopted to obtain a given cut surface shape when cutting works different in material and plate thickness.
Figure 4:
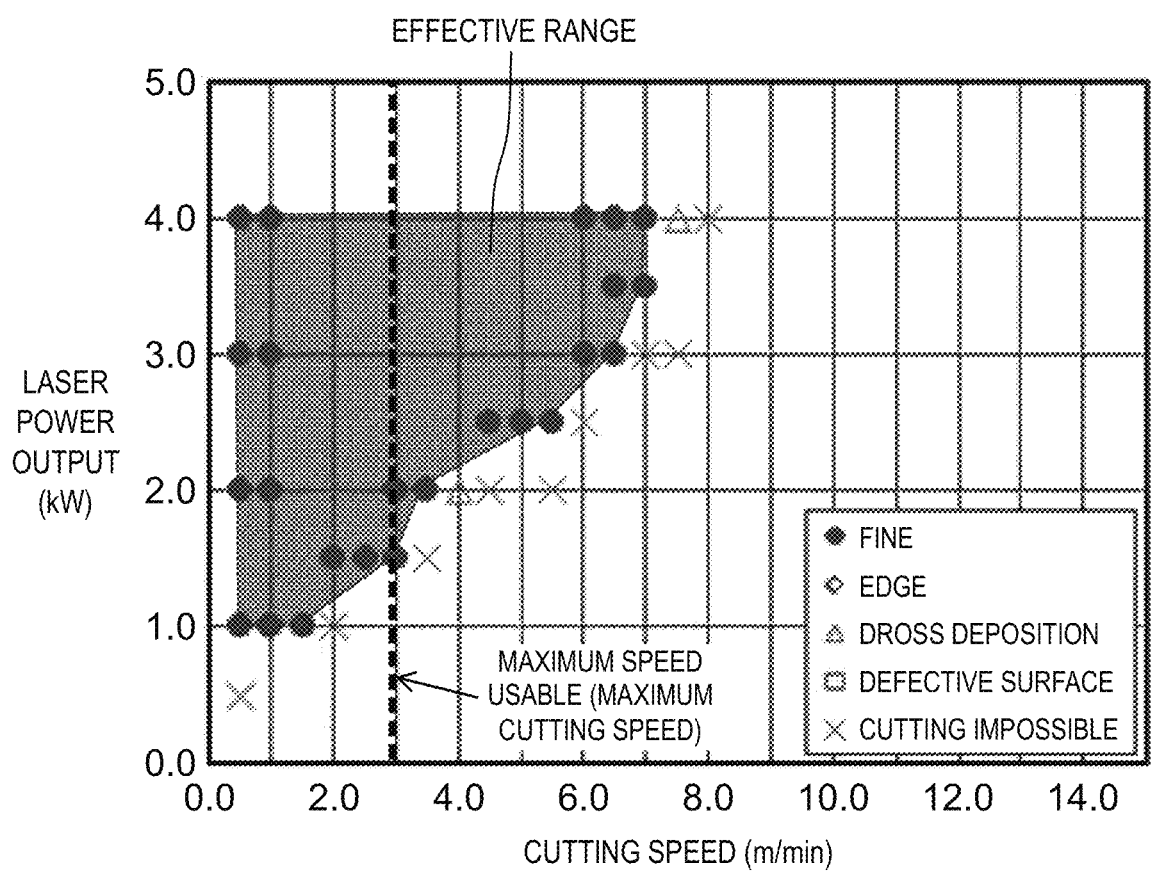
FIG. 4 depicts a range of a cutting speed of cutting a work and a laser power output, the cutting speed and laser power output being adopted to obtain a given cut surface shape when cutting a stainless steel plate of 1 mm in thickness.

FIG. 2 is a flowchart of a data collection procedure for creating a machining condition table. FIG. 3 depicts graphs each indicating a range of a cutting speed of cutting a work and a laser power output, the cutting speed and laser power output being adopted to obtain a given cut surface shape when cutting works different in material and plate thickness. FIG. 4 depicts a range of a cutting speed of cutting a work and a laser power output, the cutting speed and laser power output being adopted to obtain a given cut surface shape when cutting a stainless steel plate of 1 mm in thickness. FIG. 4 is equivalent to a graph located on the upper left among the plurality of graphs shown in FIG. 3.

Figure 5:
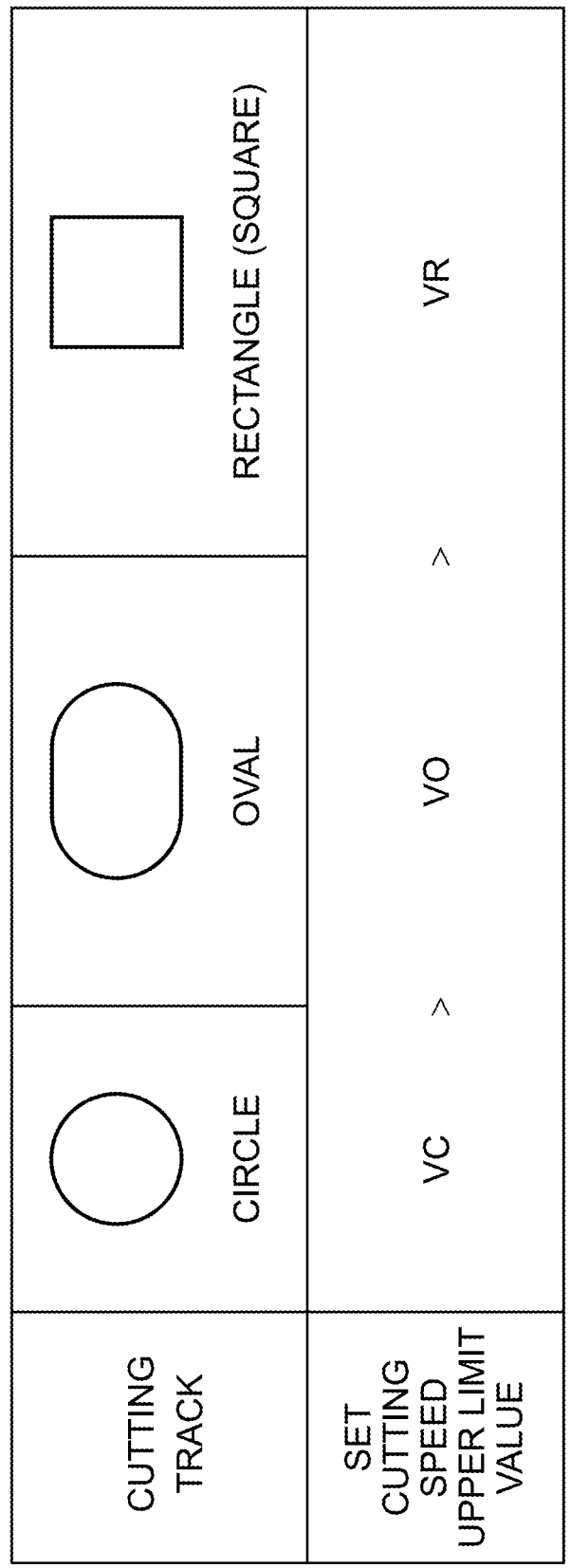
FIG. 5 is a conceptual diagram showing a variation in a cutting speed setting upper limit that corresponds to a variation in a cutting track.

FIG. 5 is a conceptual diagram showing a variation in a cutting speed setting upper limit that corresponds to a variation in a cutting track. FIG. 6 is a conceptual view showing a state of storage of machining condition tables in memory 110. A data collection procedure for creating a machining condition table used for laser cutting will first be described with reference to FIG. 2.

Work 108 made of a given material and having a given plate thickness is prepared. A type of an assist gas used at execution of laser cutting is determined (step S21). At a point of data collection, a cutting shape of the work is defined as linear. However, the cutting shape may be a circular shape or the like, which will be described later. It is preferable that the cutting shape be a shape that makes a cutting speed change during cutting unnecessary.

As machining conditions for cutting prepared work 108, machining condition group 1 (first machining condition group) is set (step S22). Machining condition group 1 includes, as parameters, a focus position of laser beam 109, a distance between work 108 and the front end of laser machining head 103, and a gas pressure and a discharge diameter of an assist gas. A flow rate of the assist gas is also included in machining condition group 1. This flow rate is determined by the gas pressure and the discharge diameter of the assist gas. Machining condition group 1 further includes, as a parameter, a type of the condensing lens placed inside laser machining head 103. The type of the condensing lens includes information on a material, a shape, and the like of the condensing lens, such as information indicating where the condensing lens is a spherical lens or non-spherical lens. Machining condition group 1 is input on input unit 112 and is transmitted from cutting condition setting device 106 to controller 105, where machining condition group 1 is stored in memory 110.

Subsequently, machining condition group 2 (second machining condition group) is set (step S23). Machining condition group 2 includes, as parameters, a laser oscillation frequency and a laser power output duty of laser oscillator 102. Machining condition group 2 may include other conditions, such as an oscillation wavelength of laser beam 109. The laser power output duty refers to a ratio between a time during which laser power output is on and a time during which the same is off in an oscillation cycle. Machining condition group 2 is stored in memory 110 of controller 105, as machining condition group 1 is.

Further, machining condition group 3 (third machining condition group) is set (step S24). Machining condition group 3 includes, as parameters, a cutting speed and laser power output. The cutting speed is a speed at which work 108 is cut by laser beam 109 along a given cutting direction. According to this exemplary embodiment, the cutting speed is equivalent to a movement speed at which the front end of laser machining head 103 moves along a given cutting track of work 108. In other words, the cutting speed is equivalent to a movement speed at which the front end of laser machining robot 130 moves along the given cutting track of work 108. Machining condition group 3 is stored in memory 110 of controller 105, as machining condition groups 1, 2 are.

As it will be described later, when the front end of laser machining robot 130 is caused to move along an exterior shape of work 108 or the given cutting track with given tracking accuracy, an upper limit and a lower limit are set on the movement speed of the front end of laser machining robot 130. This is because that, to cause laser machining robot 130 to move its front end, the plurality of articulated shafts of manipulator 104 need to be operated in a coordinated manner as a machining position of laser machining robot 130 is taken into consideration, and setting a speed upper limit value is essential in adjusting such an operation. Similarly, when manipulator 104 is provided as a parallel link type manipulator, a speed upper limit value is set to adjust its operation. To cause laser machining robot 130 to move its front end, a speed lower limit value is set also. In the following description, a range between these speed upper limit value and speed lower limit value may be referred to as "speed range" of laser machining robot 130. A range of a cutting speed of cutting work 108, the range being set based on the above "speed range", may be referred to as "usable range". To put it another way, "usable range" is a cutting speed range that can be used as a stable speed range in which laser machining robot 130 can operate stably when moving its front end along the shape of work 108 or the given cutting track with the given tracking accuracy. A maximum speed included in this usable range may be referred to as "maximum cutting speed".

In a state in which machining condition groups 1 to 3 have been set at steps S22 to S24, a cutting test of work 108 is carried out (step S25), and, after work 108 is cut, whether its cut part meets given finishing conditions is checked (step S26). At step S26, particularly, whether a cut surface of work 108 meets the given finishing conditions is checked. Conformity to the finishing conditions is evaluated mainly by checking surface roughness of the cut surface and the presence/absence of dross, which will be described later. For example, a cut surface having irregularities higher than a given height or a cut surface with dross deposited thereon is considered to be defective, while a cut surface with surface roughness of a given value or less or a cut surface with no dross deposited thereon is considered to be non-defective.

Subsequently, whether an effective range of the cutting speed and the laser power output has been demarcated is determined (step S27). By repeating steps S24 to S27 in sequence, the effective range of the cutting speed and the laser power output is demarcated. The "effective range" of the cutting speed and the laser power output is equivalent to an area highlighted in gray in each of graphs of FIGS. 3 and 4. When attention is paid to the cutting speed only, "the effective range of the cutting speed and the laser power output" may be referred to as "the effective range of the cutting speed".

The effective range of the cutting speed and the laser power output is demarcated in the following manner. In a case where laser machining robot 130 cuts work 108 without a specific manipulation along its shape, that is, for example, cuts a work of a flat shape in a condition in which robot 130 is not restricted in its operation by the shape of work 108, a machining shape, or a machining position of robot 130, robot 130 performs cutting processes in sequence as its cutting speed is changed within a range of an ideal speed at which robot 130 is operable (speed range) and a laser power output of laser oscillator 102 is changed up to a maximum power output (4 kW in this exemplary embodiment). A range in which a cut surface meets the given finishing conditions is then defined as the effective range of the cutting speed and the laser power output. More specifically, this effective range varies depending on the plate thickness of work 108. The thinner the work 108 is, the higher the cutting speed is, and the effective range becomes wider in an area where the cutting speed is higher. Thus, when the usable range of the cutting speed of cutting work 108, the usable range being determined based on the speed range in which laser machining robot 130 can move with the given tracking accuracy, is a small area relative to the effective area, for example, in a direction of a horizontal axis representing the cutting speed (step S27: NO), at least either of the laser oscillation frequency and the laser power output duty in plus oscillation is changed. Then, steps S24 to S26 are executed to make adjustment by which the effective range overlaps the usable range of the cutting speed of cutting the work (maximum speed usable or lower speed). A step of changing the laser power output duty is applied to a case where work 108 is a thin plate. This will be further described in detail.

When laser oscillator 102 is caused to oscillate continuously to laser-cut work 108 of a thin plate, for example, the cutting speed in a low-speed range (about 0.5 m/min to 1 m/min) leads to excessive heat input, in which case dross deposits on work 108. When work 108 is cut as laser oscillator 102 oscillates continuously, the thinner the work 108 is, the higher the cutting speed is. As a result, the effective range of the cutting speed and the laser power output becomes relatively higher than the usable range in which laser machining robot 130 is allowed to operate in such a way as to draw a highly accurate machining track. In such a case, laser oscillation at laser oscillator 102 is switched from continuous oscillation to pulse oscillation to lower the laser power output duty, thus reducing heat input to work 108. It is preferable that the laser power output duty be determined to be about 25% or more and 50% or less. According to the present invention, work 108 may be called "thin plate", "medium-thickness plate", or "thick plate" according to respective plate thicknesses work 108 has. For example, work 108 of 0.5 mm or more and 2 mm or less in plate thickness is called thin plate, the same of 2 mm or more and 4 mm or less in plate thickness is called medium-thickness plate, and the same of 4 mm or more and 6 mm or less in plate thickness is called thick plate. However, work 108 of 0.5 mm in plate thickness may be regarded as a thin plate while the same of 6 mm or more in plate thickness may be regarded as a thick plate.

Whether the acquired effective range is sufficient is determined properly according to the material of work 108 or the like. When the effective range is demarcated, it is associated with machining condition group 3 and is stored in memory 110 of controller 105.

Steps S24 to S27 are executed also on work 108 having a different plate thickness to judge whether an effective range has been demarcated. This process is not depicted in FIG. 2. Steps S24 to S27 are executed repeatedly and, consequently, effective ranges are demarcated (step S27: YES). This means that, at this point, pieces of data has been acquired in numbers needed for desired laser cutting of work 108, that is, effective ranges have been acquired in numbers needed (step S28).

Subsequently, machining condition groups 1 to 3 and data collected at steps S24 to S27 are associated with usable ranges of cutting speeds (step S29). Then, as machining data, an approximation of a laser power output lower value for a cutting speed is created (step S30). A relationship between the approximation and the cutting speed and the laser power output used to create the approximation will then be described with reference to FIGS. 3 and 4.

In a state in which the material and the plate thickness of work 108 are determined through the processes of steps S21 to S27 and machining condition groups 1, 2 are set, cutting is performed as the cutting speed and the laser power output are changed. As a result, the range in which the cut surface shape meets the given finishing conditions, that is, the above effective range is demarcated.

A lower boundary that demarcates the effective range of the cutting speed and the laser power output is, for example, approximated by a quadratic equation, i.e., equation (1) shown below, which is equivalent to machining data (see FIG. 8).

$$P = AV^2 + BV + C \tag{1}$$

P: laser power output

V: cutting speed

A, B, C; constant

As shown in FIG. 4, setting the cutting speed and the laser power output outside the effective range may lead to a case where dross deposits on the cut surface (which is indicated by Δ in FIG. 4) or cutting work 108 becomes impossible (which is indicated by × in FIG. 4). For example, in a case where the maximum power output of laser oscillator 102 is 4 kW and work 108 to be cut is made of an aluminum allow (A5052) and is 3.0 mm in plate thickness, even when laser oscillator 102 is caused to oscillates continuously, work 108 cannot be cut (see a graph in the third column from the left on the lower row in FIG. 3). In such a case where the cut surface shape is defective (see description of □ in FIG. 4) or an edge (burr) is formed (see description of ◇ in FIG. 4), which is not depicted in FIG. 4, the cutting speed and the laser power output are set outside the effective range. Dross is a melted part of the work that deposits thereon. When work 108 is laser-cut, a part of work 108 melts and deposits on a surface exposed to laser beam 109 and on a surface opposite thereto as well. This deposit is called dross.

As described above, the usable range is defined for the cutting speed, and this usable range, especially the speed upper limit value (see FIG. 4) changes depending on the shape of work 108, the cutting track, or the like. For example, when work 108 is a tabular plate, an upper limit value to a speed at which work 108 can be cut is higher than the same in a case of work 108 being a pipe-like plate. Likewise, when trimming is adopted as a cutting method, the upper limit value to the speed at which work 108 can be cut is higher than the same in a case of drilling being adopted as the cutting method. As shown in FIG. 5, when three types of cutting tracks of work 108, that is, circular, oval, and rectangular (square) cutting tracks exist, the upper limit value to the speed at which work 108 can be cut increases in the order of the circular, oval, and rectangular cutting tracks. This means that the following relationship holds: (speed upper limit value for the circular cutting track)>(speed upper limit value for the oval cutting track)>(speed upper limit value for the rectangular cutting track).

In this manner, to laser-cut work 108 along the given cutting track to form a fine cut surface shape, it is necessary that the usable range of the cutting speed and the effective range of the cutting speed the laser power output overlap each other, and it is particularly essential that the usable range of the cutting speed and the effective range of the cutting speed overlap each other. This will be described in detail later.

Data associated with machining condition groups 1 to 3 at step S29 and machining data generated at step S30 are put together to create a machining condition table, which is stored in memory 110 (step S31). For example, as shown in FIG. 6, when the type of condensing lens, the material and the plate thickness of the work, the type of the assist gas, and the like are set as the basic conditions, a set of machining condition groups 1 to 3 that is associated with the basic conditions is organized in a table format, and is therefore stored in memory 110 as a machining condition table. When the basic conditions are the same and specifications of laser cutting device 101 are predetermined, machining condition group 1 is fixed in many cases. Machining condition groups 2, 3, on the other hand, could be changed depending on the material, the cutting track, or the like of work 108. Parameters making up machining condition groups 2, 3 are, therefore, each recorded as a plurality of values on the same table. Particularly, parameters making up machining condition groups 3, i.e., the cutting speed and the laser power output are each recorded as a plurality of values associated with a result of check of the cut surface shape. The parameters making up machining condition groups 2, 3 are associated with the basic conditions in a matrix pattern. The approximation shown as equation (1), which is associated with the effective range of the cutting speed and the laser power output, is also recorded on the same machining condition table.

FIG. 6 depicts an example in which similar machining condition tables are created for different types of the condensing lenses, the different types representing differences in the basic conditions, and are stored in memory 110 as a machining condition table group. However, for example, attention may be paid to a difference in the material of the work, in which case a set of machining condition tables are created for different materials of the work and are stored as a machining condition table group. Processes of steps S29 to S31 are executed by processor 111 of controller 105, and results of the processes are stored in memory 110.

[Laser Cutting Procedure]

Figure 7:
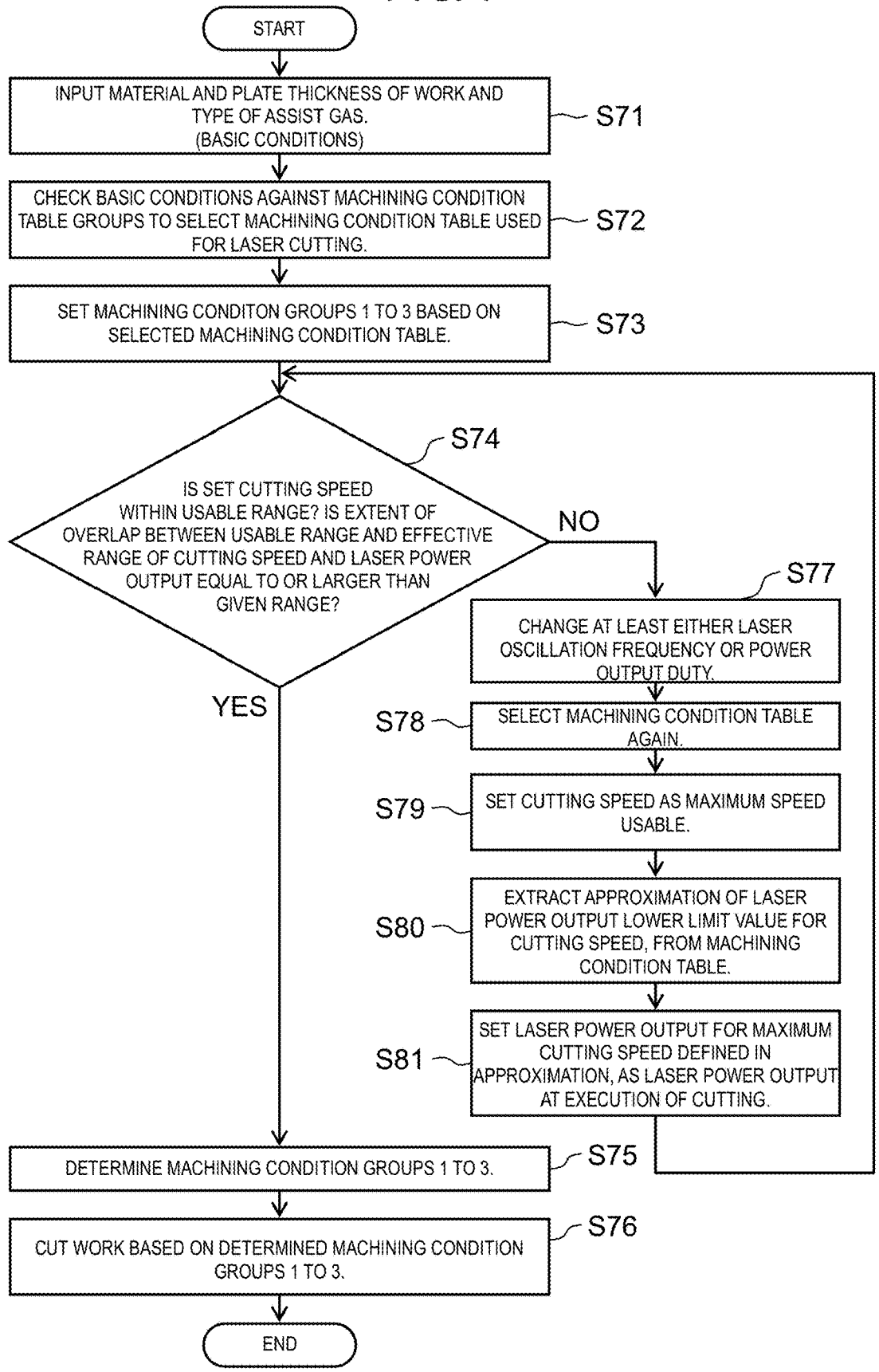
FIG. 7 is a flowchart of a laser cutting procedure.

FIG. 7 is a flowchart of a laser cutting procedure. FIG. 8 is a conceptual diagram consisting of charts indicating changes in an extent of an overlap between the usable range of the cutting speed and the effective range of the cutting speed and the laser power output, the changes resulting from review of machining conditions. An overall flow of the laser cutting procedure will first be described with reference to FIG. 7, and then details of the procedure will be described specifically with reference to FIG. 8. It is assumed that in a state in which data are collected by the procedure shown in FIG. 2 and the machining condition table group is stored in memory 110 of controller 105 of control unit 120, work 108 is laser-cut by the laser cutting procedure shown in FIG. 7.

First, conditions including the material and plate thickness of work 108 to be cut and the type of the assist gas, that is, the basic conditions to meet when performing laser cutting are checked. Specifically, cutting condition setting device 106 of control unit 120 receive these basic conditions input on input unit 112 (step S71: basic condition input step). Although it is not described in step S71, the basic conditions include also teaching data (teaching) on the cutting track of work 108 and the type of the condensing lens. These input basic conditions are stored in memory 110. In this case, the basic conditions may be stored temporarily in memory 110.

Processor 111 of controller 105 of control unit 120 checks the input basic conditions against the machining condition table group stored in memory 110, and selects a machining condition table used for the current laser cutting (step S72: machining table selecting step).

Processor 111 sets machining condition groups 1 to 3, based on the selected machining condition table. Specifically, processor 111 stores machining condition groups 1 to 3 in a given area of memory 110 (which will hereinafter be referred to also as "work area" and may be a temporary memory area) (step S73: machining condition setting step). Machining condition setting is carried out also at steps S79, S81, which will be described later. At these steps, however, machining condition information already stored in the work area is written with newly set machining condition information.

Because the basic conditions and the specifications of laser cutting device 101 are determined already, specific values are selected from respective values of parameters making up machining condition groups 2, 3.

Subsequently, processor 111 judges whether a set cutting speed is within the usable range or judges whether an extent of an overlap between the usable range and the effective range demarcated by the cutting speed and the laser power output is equal to or large than a given range (step S74: cutting speed judging step). At step S74, processor 111 may only judge whether the set cutting speed is within the usable range (range of the maximum speed usable) or only judge whether the extent of the overlap between the usable range and the effective range demarcated by the cutting speed and the laser power output is equal to or large than the given range. A size of this given range will be described later.

When a judgment made at step S74 is an affirmative one (step S74: YES), processor 111 determines machining condition groups 1 to 3, together with the values selected from machining condition groups 2, 3 at step S73, to be recommended conditions (step S75: machining condition determining step). Processor 111 may display contents of determined machining condition groups 1 to 3 on display 113.

Based on determined machining condition groups 1 to 3, processor 111 then controls operations of laser machining robot 130 and laser oscillator 102 so that work 108 is cut (step S76: cutting step).

When the judgment made at step S74 is a negative one (step S74: NO), on the other hand, either a laser oscillation frequency or a laser power output duty is changed (step S77). Based on a result of the condition change at step S77, processor 111 then selects a machining condition table again (step S78: machining condition table reselecting step (which includes step S77)). Based on the machining condition table selected again, processor 111 sets the cutting speed to a maximum speed usable (maximum cutting speed) (step S79: cutting speed setting step). Subsequently, an approximation recorded on the machining condition table selected again, which is, in this case, an approximation of a laser power output lower limit value for the cutting speed, the approximation being expressed as equation (1), is extracted (step S80).

A laser power output for a maximum cutting speed defined in the approximation extracted at step S80 is then set as a laser power output at execution of cutting (step S81: laser power output setting step). The reason for this step will be described later. Subsequently, whether the set cutting speed is within the usable range or whether the extent of the overlap between the usable range and the effective range of the cutting speed and the laser power output is equal to or large than the given range is determined again (step S74). This loop of steps is repeated until an affirmative judgment is made at step S74. When a change of the power output duty or the like and laser power output setting based the approximation are completed in one cycle, however, the procedure flow may proceed directly from step S81 to step S75.

Results of selecting the machining condition table at steps S72, 78 and a result of determining the machining conditions at step S75 are displayed on display 113 of cutting condition setting device 106 of control unit 120.

Details of processes of steps S77 to S81 will be described with reference to FIG. 8.

Depending on the material and the plate thickness of work 108, a machining condition table not allowing the usable range of the cutting speed and the effective range of the cutting speed and the laser power output to overlap each other is selected in some cases. For example, as shown in a graph on the left on an upper row in FIG. 8, when a thin plate of stainless steel is cut, the laser power output duty is set for 100%, that is, laser oscillator 102 is caused to oscillate continuously. In this case, work 108 cannot be cut along the given cutting track as the cut surface shape is kept in a fine condition. Reviewing the machining conditions is therefore necessary.

To deal with this problem, the laser power output duty is reduced to, for example, 50% so that the usable range of the cutting speed and the effective range of the cutting speed and the laser power output overlap each other. As a result, as shown in a graph on the left on a lower row in FIG. 8, the cutting speed is set within a range of speed at which laser machining robot 130 can operate, which allows laser cutting to be performed with desired machining quality.

Figure 8:
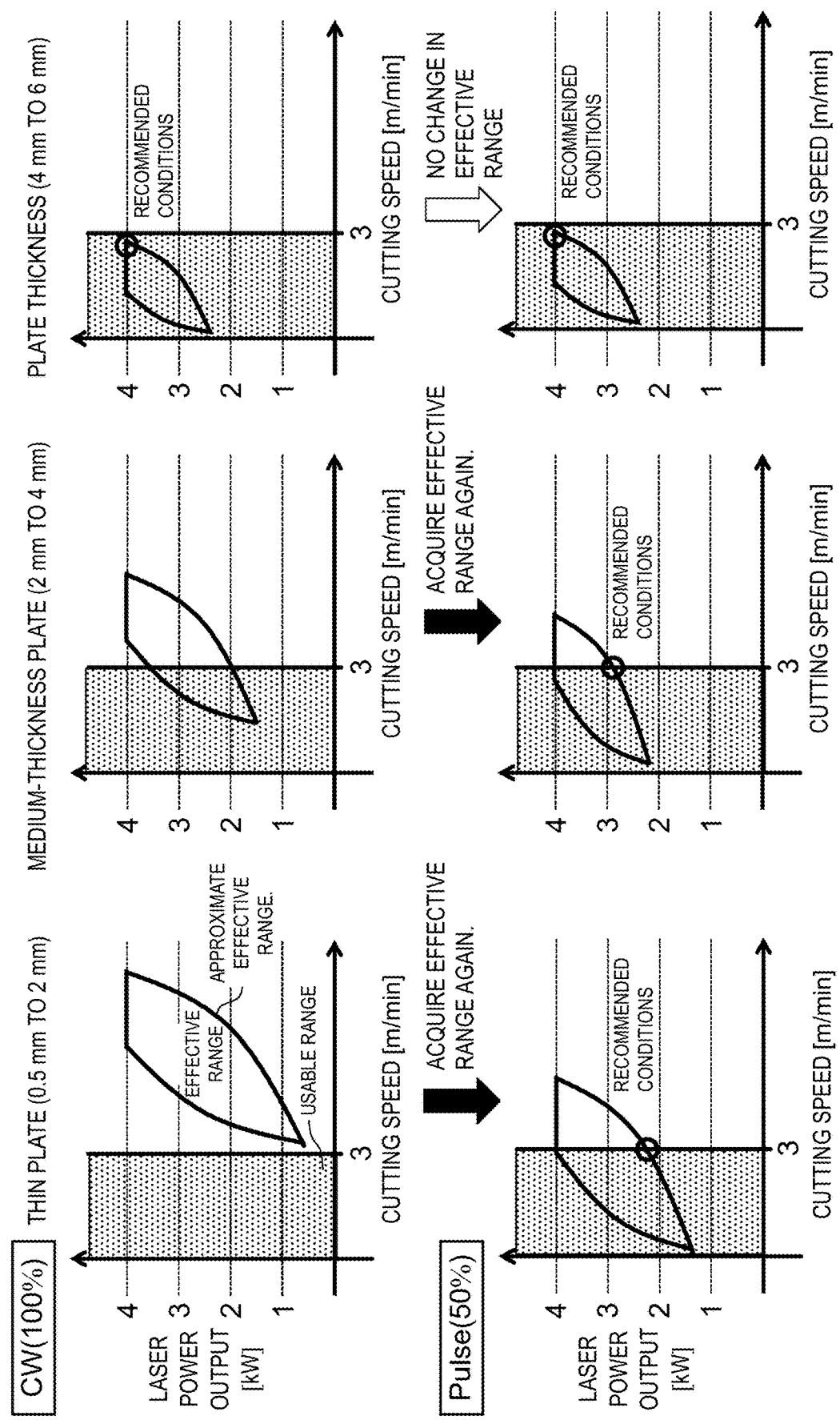
FIG. 8 is a conceptual diagram consisting of charts indicating changes in an extent of an overlap between a usable range of a cutting speed and an effective range of the cutting speed and a laser power output, the changes resulting from review of machining conditions.

In another case, where work 108 having a larger plate thickness, e.g., a medium-thickness plate (2 mm to 4 mm in thickness) is cut, the usable range of the cutting speed and the effective range of the cutting speed and the laser power output come to overlap each other even when the laser power output duty is 100%, as shown in a graph at the middle on the upper row in FIG. 8. However, as the plate thickness of work 108 becomes smaller, the effective range of the cutting speed and the laser power output becomes relatively larger, and consequently, an overlap between the usable range of the cutting speed and the effective range of the cutting speed and the laser power output becomes smaller. The smaller overlap leads to variation in the operation of laser machining robot 130 and in the laser power output, thus leading to a case where a fine cut surface shape cannot be obtained. In such a case, the laser power output duty is reduced to, for example, 50% to shift the effective range of the cutting speed and the laser power output to a low-speed side. This reduces variation in processes by laser cutting device 101, thus allowing laser cutting to be performed with desired machining quality (see a graph at the middle of the lower row and the graph on the left on the lower row in FIG. 8). When work 108 is a thick plate having a sufficient thickness, the usable range of the cutting speed and the effective range of the cutting speed and the laser power output overlap each other to form a sufficiently large overlapping area, as shown in a graph on the right on the upper row. In this case, therefore, changing the laser power output duty is unnecessary (see a graph on the right on the lower row in FIG. 8).

Whether the extent of the overlap between the usable range of the cutting speed and the effective range of the cutting speed and the laser power output is equal to or larger than the given range is determined properly by specifications required for laser cutting, an allowable range of variation in the operating speed of laser machining robot 130, an allowable range of variation in the laser power output, and the like. For example, when a laser machining robot with large variation in the operating speed is used as laser machining robot 130, it is necessary to determine the above given range to be large. When variation in power output of laser oscillator 102 is kept low, in contrast, the given range may be determined to be small.

At step S81, the laser power output for the maximum cutting speed defined in the approximation expressed as equation (1) is set as the laser power output at execution of cutting. This setting is made for the following reason.

In the process of laser-cutting work 108, if laser beam 109 incident on a front surface of work 108 penetrates it to reach its back surface, laser beam 109 eventually leaks out of the back surface of work 108. In other words, laser beams 109 travels through work 108 to come out thereof. When a ratio of such leak light increases, a ratio of ineffective power not used for laser cutting increases, which results in an increase in machining cost. Usually, a specific arrangement is made so that leak light having traveled through work 108 is reflected by a machining jig or the like disposed on the back surface of work 108 but is not emitted onto equipment or an operator near work 108. However, when the ratio of such leak light increases, leak light with greater intensity damages a member, such as the machining jig, disposed on the back surface of work 108. This creates a need of frequent replacement of the member. As a result, running cost for performing laser cutting increases. Extensive damage to the member may lead to a case where leak light is reflected irregularly on a surface of the member and falls onto equipment or the operator near work 108. In such a case, the human body's exposure to leak light is particularly hazardous.

To avoid such a problem, it is preferable that the laser power output at execution of laser cutting be low as much as possible. It is therefore preferable that a laser power output value defined at the lower boundary of the effective range of the cutting speed and the laser power output be set as a laser power output to be used. However, as described above with reference to the flowchart shown in FIG. 2, the effective range is demarcated using actual measurements. Setting the laser power output value as one of those measurements, therefore, requires interpolation. To make this interpolation easy, the method of setting the laser power output using the approximation expressed as equation (1) is adopted.

In the example shown in FIG. 8, only the laser power output duty is changed. To shift the effective range of the cutting speed and the laser power output, however, any one of parameters making up machining condition group 2, that is, either or both of the laser oscillation frequency and the laser power output duty may be changed.

[Effects and the Like]

As described above, laser cutting device 101 according to this exemplary embodiment is configured to emit laser beam 109 output from laser oscillator 102 onto work 108 via transmission fiber 107 and laser machining head 103 fitted to the front end of laser machining robot 130, to cut work 108.

Laser cutting device 101 includes control unit 120 that controls operations of laser machining robot 130 and laser oscillator 102. Control unit 120 includes controller 105, and cutting condition setting device 106 connected to controller 105. Controller 105 has memory 110 storing therein a plurality of cutting condition tables carrying data on cutting conditions, and processor 111 that sets and calculates desired cutting conditions according to a machining condition table stored in memory 110 and given input made by the operator. Cutting condition setting device 106 has input unit 112 on which given information on cutting is input, and display 113 that displays cutting conditions or the like.

Laser machining robot 130 has a predetermined speed range in which laser machining robot 130 is allowed to move with a given tracking accuracy, and a usable range of a cutting speed of cutting work 108 by laser cutting device 101 is set, based on the speed range.

Each of the machining condition tables stored in memory 110 of controller 105 includes, as values set according to the material and the plate thickness of work 108, at least a laser oscillation frequency, a laser power output, a laser power output duty, the usable range of the cutting speed, an effective range demarcated by a cutting speed and a laser power output that are set so that a cut surface of work 108 meets given finishing conditions, and an approximation of a lower boundary of the effective range.

Control unit 120 selects a machining condition table from the plurality of machining condition tables stored in memory 110 so that the cutting speed and the laser power output meet given conditions, and controls operations of laser machining robot 130 and laser oscillator 102 so that work 108 is cut based on the selected machining condition table.

According to laser cutting device 101 of this exemplary embodiment, a machining condition table is selected from a machining condition table group acquired in advance so that the cutting speed and the laser power output meet the given conditions, i.e., the conditions under which the effective range of the cutting speed and the laser power output and the usable range of the cutting speed overlap each other. As a result, laser cutting conditions can be set easily.

When an extent of an overlap between the effective range and the usable range of the cutting speed, the effective range and the usable range being included in the selected machining condition table, is smaller than a given range, laser cutting device 101 changes at least either of the laser oscillation frequency and the laser power output duty and selects a machining condition table again so that the extent of the overlap between the ideal effective range of the cutting speed and the laser power output and the usable range of the cutting speed becomes equal to or larger than the given range. In this manner, laser cutting device 101 changes at least either of the laser oscillation frequency and the laser power output duty and selects a machining condition table again. Laser cutting device 101 then sets the cutting speed as a maximum cutting speed that is a maximum in the usable range, and sets the laser power output as a laser power output value for the maximum cutting speed defined in an approximation of a lower boundary of the effective range of the cutting speed and the laser power output. The above change, reselection, and setting are repeated until the extent of the overlap between the ideal effective range of the cutting speed and the laser power output and the usable range of the cutting speed becomes equal to or larger than the given range. Thus, a machining condition table can be selected again so that the extent of the overlap between the effective range and the usable range of the cutting speed becomes equal to or larger than the given range.

Through this procedure, laser cutting device 101 is allowed to have a large operation margin while maintaining desired machining quality, thus being able to perform stable laser cutting.

A laser cutting method according to this exemplary embodiment is a laser cutting method of emitting laser beam 109 output from laser oscillator 102 onto work 108, laser oscillator 102 being controlled in operation by control unit 120, via transmission fiber 107 and laser machining head 103 fitted to a front end of laser machining robot 130 controlled in operation by control unit 120, to cut work 108. The laser cutting method includes the following steps. The laser cutting method according to this exemplary embodiment include a basic condition input step of receiving input of basic conditions applied at execution of laser cutting, the basic conditions including a material and a plate thickness of work 108, a machining condition table selecting step of checking the basic conditions input at the basic condition input step against a machining condition table group stored in memory 110 included in control unit 120, the machining condition table group including a plurality of machining condition tables carrying various parameters on laser cutting, to select a machining condition table corresponding to laser cutting of a desired form, a machining condition setting step of setting machining conditions for laser cutting, based on the machining condition table selected at the machining condition table selecting step, a cutting speed judging step of judging whether a cutting speed of cutting work 108 meets given conditions under the machining conditions set at the machining condition setting step, that is, in this case, judging whether the cutting speed of cutting work 108 is within a usable range set based on a speed range preset for laser machining robot 130 or judging whether an extent of an overlap between an effective range, which is demarcated by a cutting speed and a laser power output that are set so that a cut surface of work 108 meets given finishing conditions, and the usable range of the cutting speed is equal to or larger than a given range, and a cutting step of controlling operations of laser machining robot 130 and laser oscillator 102 so that work 108 is cut based on a result of the judgment made at the cutting speed judging step.

According to the laser cutting method of this exemplary embodiment, when the basic conditions including the material and the plate thickness of work 108 are determined, the basic conditions are checked against the machining condition table group acquired in advance to judge whether the cutting speed meets the given conditions, that is, whether the extent of the overlap between the effective range of the cutting speed and the laser power output and the usable range of the cutting speed is equal to or larger than the given range, and then cutting is performed. Thus, stable machining conditions with a wide operation margin are set easily, and laser cutting of work 108 can be performed under on such machining conditions.

The laser cutting method of this exemplary embodiment further includes a machining condition table reselecting step of changing either the laser oscillation frequency or the laser power output duty and selecting a machining condition table again, a cutting speed setting step of setting the cutting speed as a maximum cutting speed that is a maximum in the usable range, and a laser power output setting step of extracting an approximation of a laser power output lower value for a cutting speed recorded on the machining condition table reselected at the machining condition table reselecting step and setting a laser power output for the maximum cutting speed defined in the approximation, as a laser power output at execution of cutting. When the judgment made at the cutting speed judging step is an affirmative one, work 108 is cut at the cutting step, based on the machining conditions set at the machining condition setting step. When the judgment made at the cutting speed judging step is a negative one, on the other hand, work 108 is cut at the cutting step, based on the cutting speed set as the maximum speed usable, at the cutting speed setting step, and on the laser power output set at the laser power output setting step.

Through this procedure, stable machining conditions with a wide operation margin are set as desired machining quality is maintained, and laser machining of work 108 can be performed under such machining conditions.

Second Exemplary Embodiment

Figure 9:
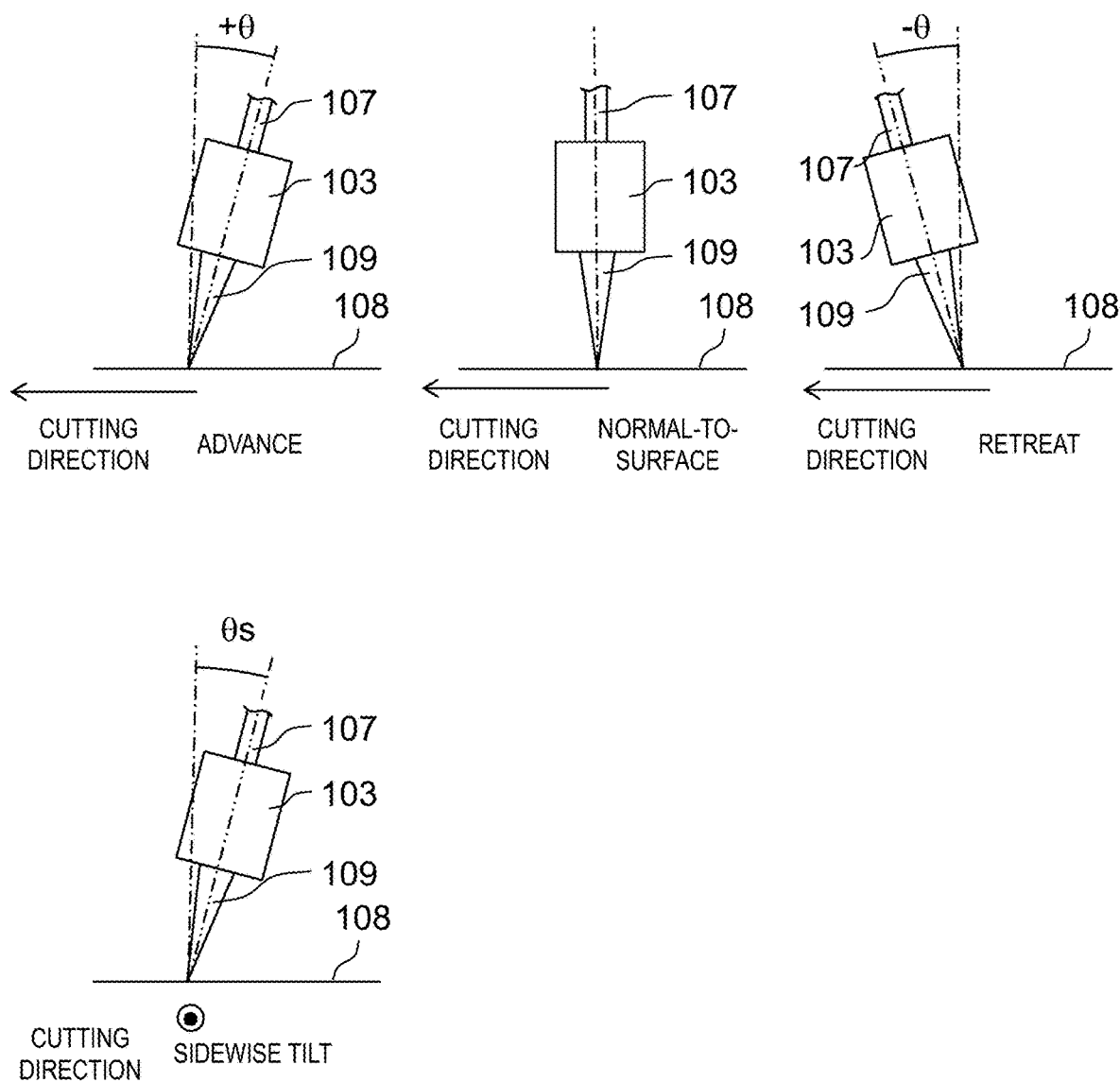
FIG. 9 is a diagrammatical view showing states of tilt of a laser machining head against a cutting direction, according to a second exemplary embodiment.

FIG. 9 is a diagrammatical view showing states of tilt of laser machining head 103 against a cutting direction, according to a second exemplary embodiment.

When the shape of work 108 along which laser machining head 103 moves changes, that is, a cutting track changes in the midst of a cutting process, a state of tilt of laser machining head 103 against work 108 may be changed. In such a case, the articulated shafts of laser machining robot 130 are operated to allow laser machining head 130 to take a plurality of tilted positions, e.g., an advance position, a retreat position, and a normal-to-surface position, as shown in FIG. 9. The advance position refers to a position in which the front end of laser machining head 103 is located ahead of the rear end of the same in a direction of cutting of work 108, as indicated by a figure on the left on the upper side in FIG. 9. Specifically, the advance position is the position in which an optical axis of laser beam 109 emitted from laser machining head 103 tilts against the surface of work 108 by a tilt angle of +θ relative to a normal to the surface. The retreat position refers to a position in which the front end of laser machining head 103 is located behind the rear end of the same in the direction of cutting of work 108, as indicated by a figure on the right on the upper side in FIG. 9. Specifically, the retreat position is the position in which the optical axis of laser beam 109 emitted from laser machining head 103 tilts against the surface of work 108 by a tilt angle of −θ relative to the normal to the surface. The normal-to-surface position refers to a position in which the optical axis of laser beam 109 emitted from laser machining head 103 is normal to the surface of work 108, as indicated by a figure at the center on the upper side in FIG. 9. The tilt angle θ of laser machining head 103 is defined as a positive angle in the advance position and as a negative angle in the retreat position with respect to zero tilt angle θ in the normal-to-surface position.

As indicated in a figure on the lower side in FIG. 9, laser machining head 103 could tilt also in a direction intersecting the direction of cutting of work 108 (sidewise tilt). It is preferable that, to eliminate a melted material efficiently through a flow of the assist gas in a direction in which laser machining head 103 advances to suppress deposition of dross on the cut surface, laser machining head 103 be in a state of tilt to take the advance position. This will be described further later.

When laser machining head 103 is in a state of tilt, however, if laser machining head 103 in the advance position has a tilt angle θ that is excessively large or laser machining head 103 is in the retreat position, a finished condition of the cut surface of work 108 may become inferior.

Figure 10:
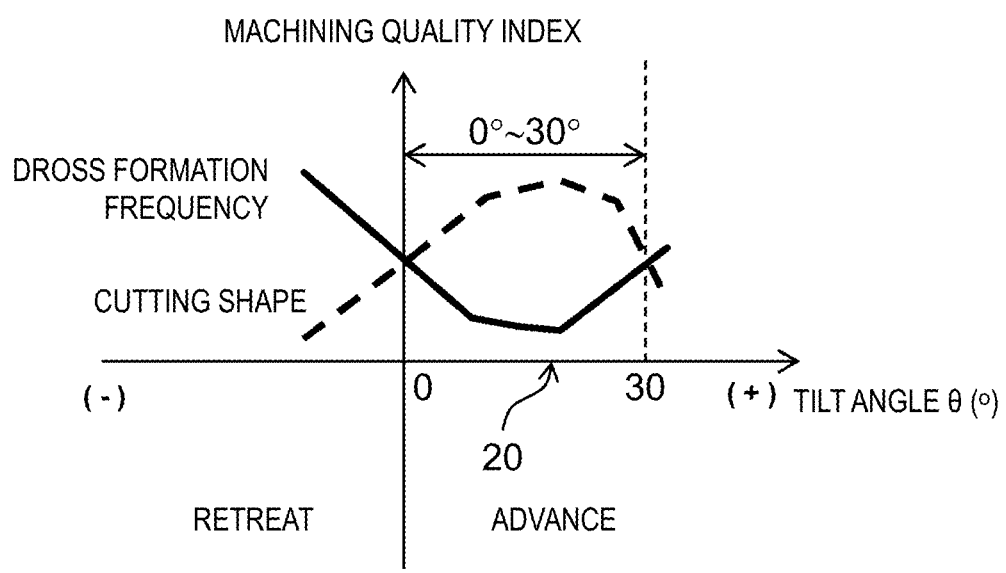
FIG. 10 is a diagrammatical view showing a change in a machining quality index for laser cutting that is plotted against a change in a tilt angle of the laser machining head.

FIG. 10 is a diagrammatical view showing a change in a machining quality index for laser cutting that is plotted against a change in the tilt angle of laser machining head 103. FIG. 10 depicts a case where a sidewise tilt of laser machining head 103 does not exist, that is, a sidewise tilt θs shown in the figure on the lower side in FIG. 9 is 0 degree.

As shown in FIG. 10, when the tilt angle of laser machining head 103 is changed to cause laser machining head 103 to shift from the retreat position (tilt angle −θ) to the normal-to-surface position (zero tilt angle), frequency of dross formation on the cut surface of work 108 reduces. When laser machining head 103 is further tilted to cause it to shift from the normal-to-surface position (zero tilt angle) to the advance position (tilt angle +θ), the frequency of dross formation reaches its minimum at a given tilt angle, which is, in this case, 20 degrees. When the tilt angle θ is then increased further in the positive direction, the frequency of dross formation starts increasing. When the tilt angle of laser machining head 103 is changed to cause laser machining head 103 to shift from the retreat position (tilt angle −θ) to the normal-to-surface position (zero tilt angle), the cut surface shape of work 108 is improved. When laser machining head 103 is further tilted to cause it to shift from the normal-to-surface position (zero tilt angle) to the advance position (tilt angle +θ), the cut surface shape, in this case, reaches its finest state at a given tilt angle in a range between 0 degree and 30 degrees. When the tilt angle θ is then increased further in the positive direction, the cut surface shape starts getting inferior. Because a range of the tilt angle θ in which the frequency of dross formation is low and the cut surface shape is fine changes depending on the material and the plate thickness of work 108, the material and the plate thickness of work 108 are associated with the tilt angle of laser machining head 103 in a machining condition table.

In this manner, the tilt angle θ of laser machining head 103 is also one of important machining conditions for laser cutting. By associating the tilt angle θ of laser machining head 103 with various parameters recorded on the machining condition table, as one of the basic conditions shown in FIG. 6, therefore, setting conditions for laser machining of work 108 can be further simplified.

It is clearly understood from FIG. 10 that laser machining head 103 should preferably perform cutting in its advance position, that is, in the position in which the front end of laser machining head 103 is located ahead of the rear end of the same in the direction of cutting of work 108. It is also preferable that the tilt angle θ of laser machining head 103 be determined to be 0 degree or more and 30 degrees or less. It is more preferable, in particular, that a thin plate on which a melted metal produced by laser cutting tends to flow in a laser emission direction be subjected to laser cutting by laser machining head 103 in the advance position.

It is preferable that the sidewise tilt angle θs of laser machining head 103 be zero degree. However, the sidewise tilt angle θs may be determined to be ±several degrees by taking into consideration an allowable range for variation in the operation of laser machining robot 130, an allowable range for variation in attachment of laser machining head 103, and an allowable range for variation in setting work 108 relative to a machining jig.

Third Exemplary Embodiment

Figure 11:
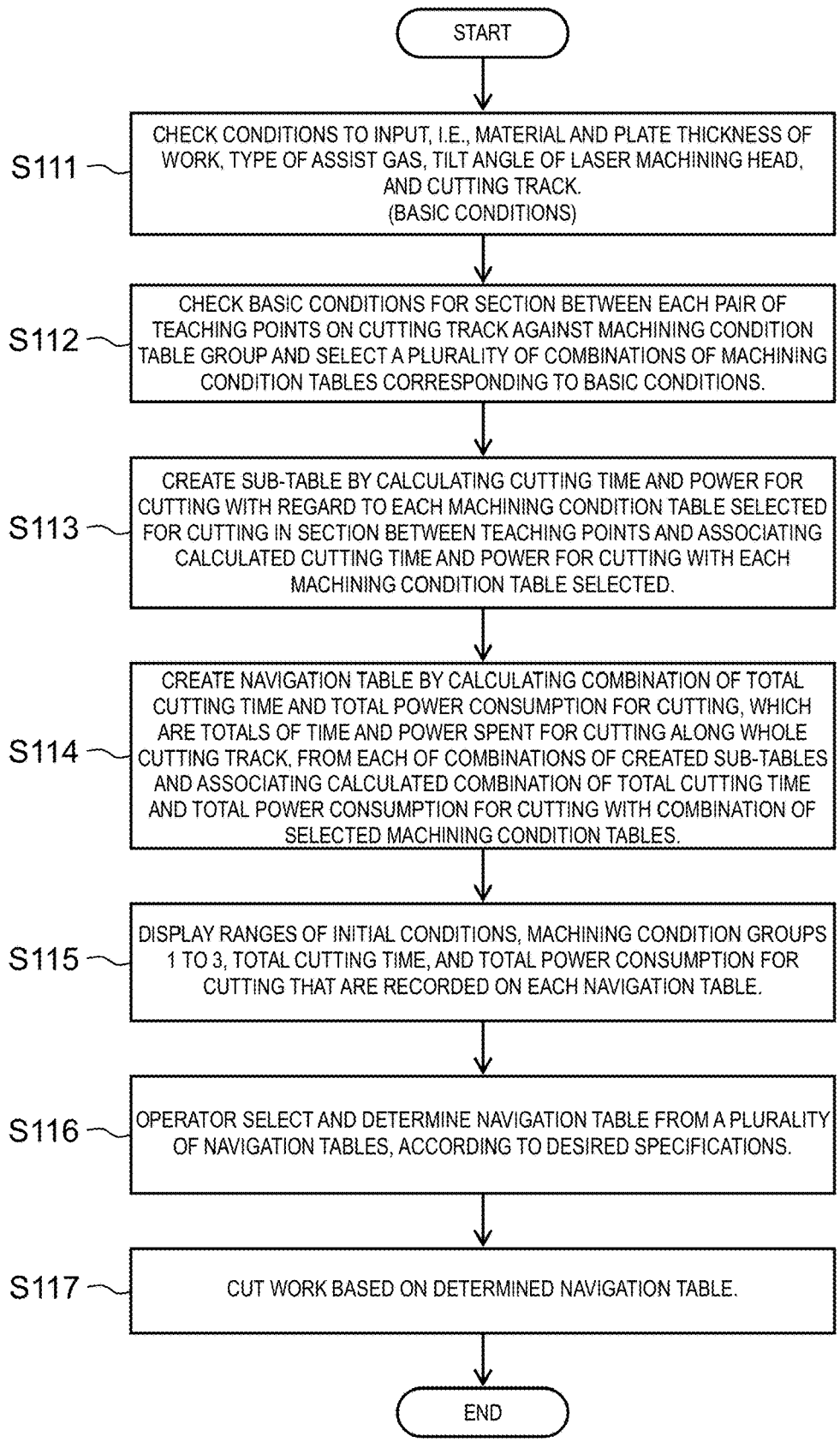
FIG. 11 is a flowchart of a laser cutting procedure according to a third exemplary embodiment of the present disclosure.
Figure 12:
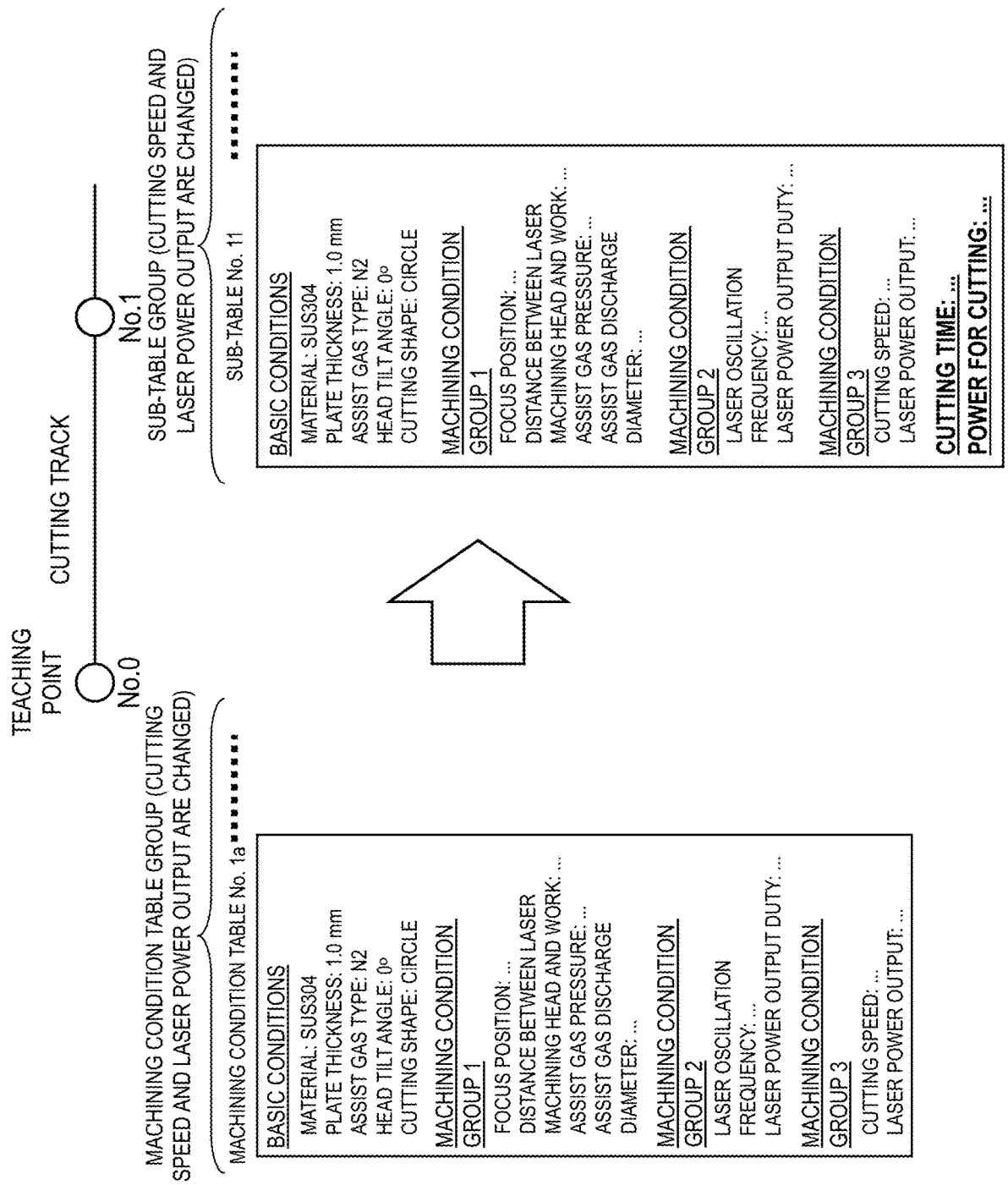
FIG. 12 is a conceptual view showing a procedure for creating a sub-table.
Figure 13:
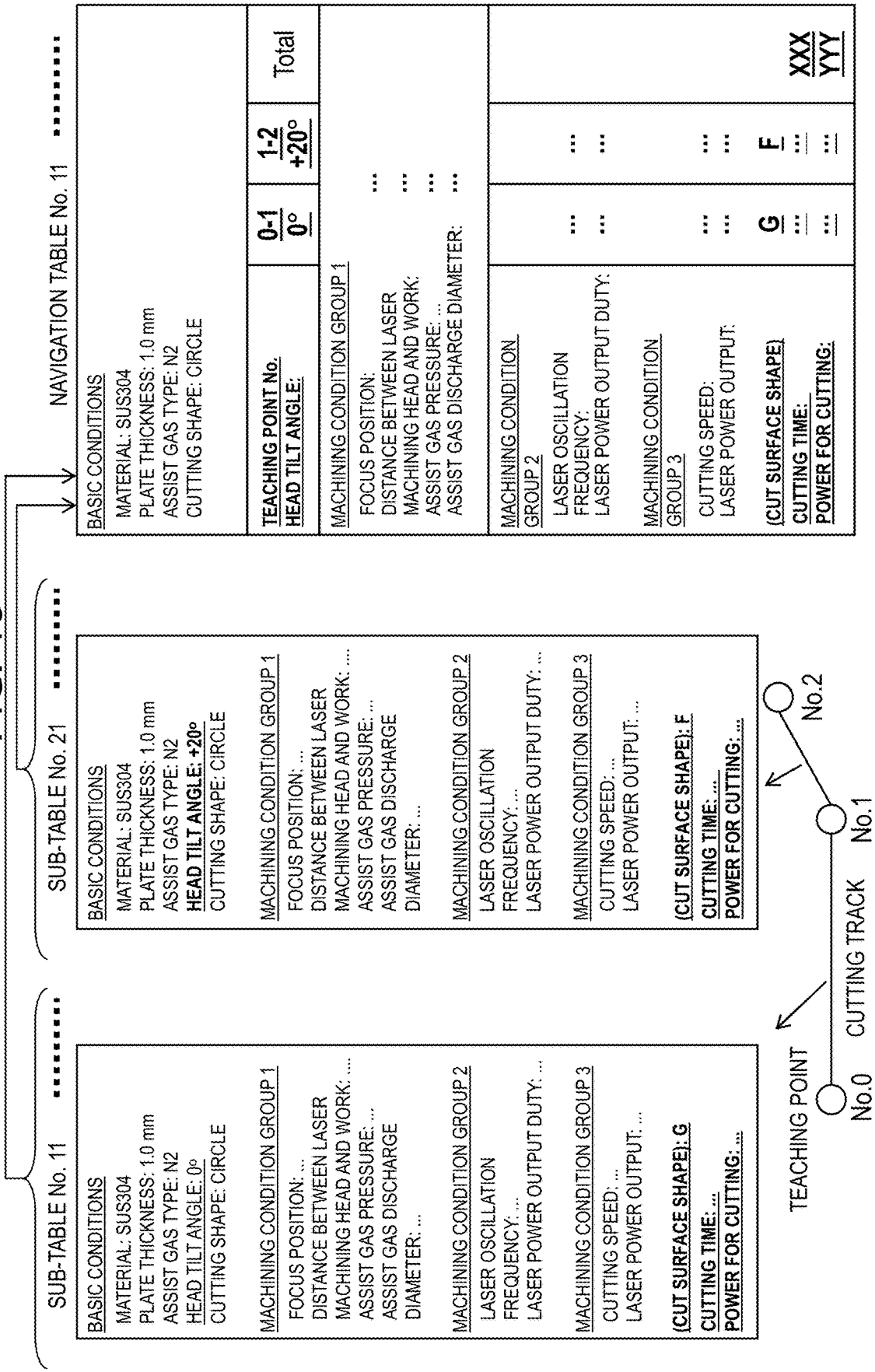
FIG. 13 is a conceptual view showing a procedure for creating a navigation table.
Figure 14:
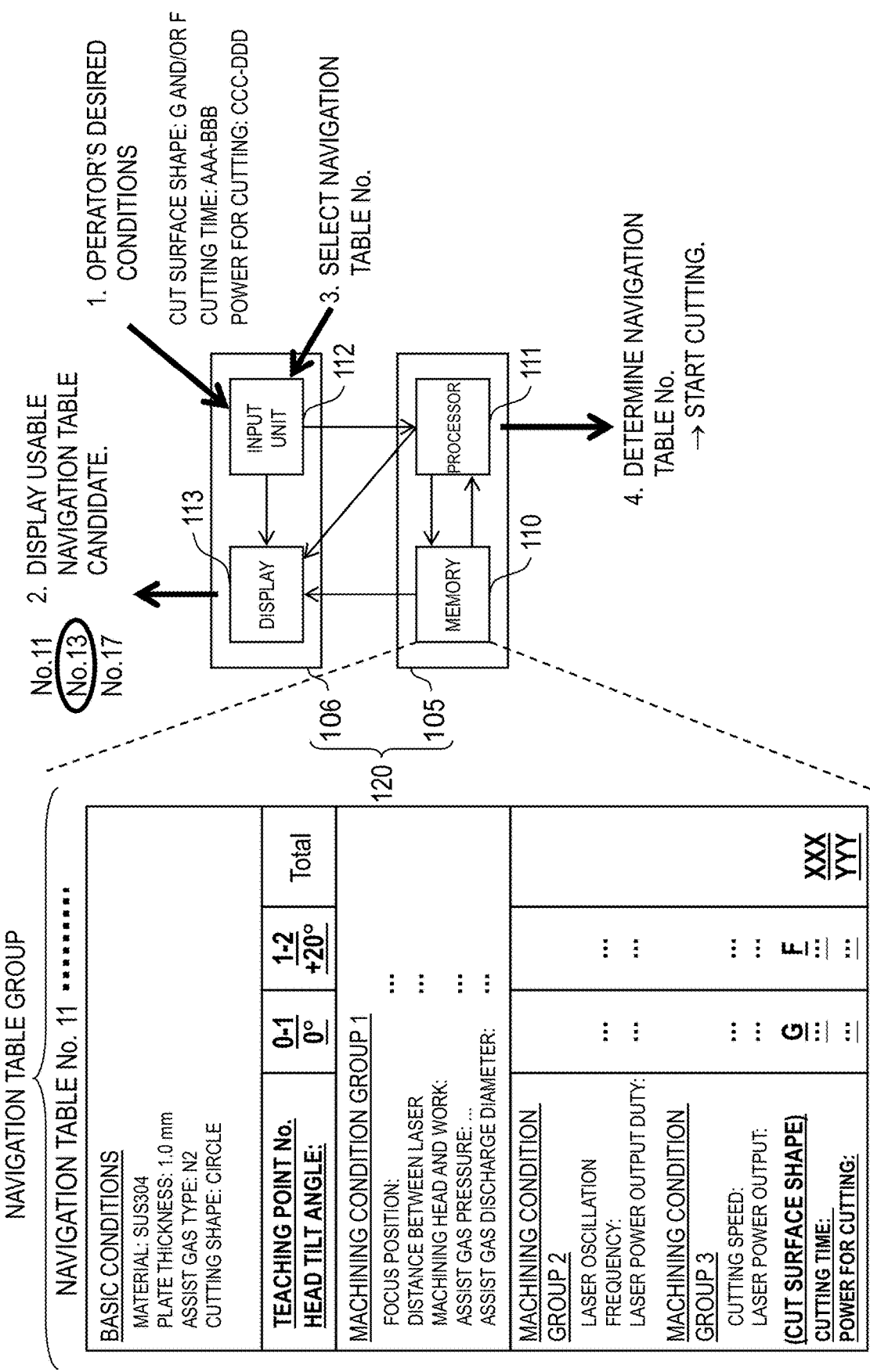
FIG. 14 is a conceptual view showing a procedure for selecting a navigation table.

FIG. 11 is a flowchart of a laser cutting procedure according to a third exemplary embodiment. FIG. 12 is a conceptual view showing a procedure for creating a sub-table. FIG. 13 is a conceptual view showing a procedure for creating a navigation table. FIG. 14 is a conceptual view showing a procedure for selecting a navigation table.

In the first and second exemplary embodiments, laser cutting conditions are set, based mainly on the speed range of laser machining robot 130, i.e., the usable range of the cutting speed and on the effective range demarcated by the cutting speed and the laser power output. The effective range is determined, based mainly on the cut surface shape of work 108.

However, when laser cutting of work 108 is performed, such factors as a cutting tact time (cutting time) and an amount of power used for cutting are considered to be more important than the cut surface shape in some cases. A method and a configuration that, in such a case, allow an operator who carries out laser cutting to select machining conditions according to desired specifications will be described in the third exemplary embodiment.

Basic conditions are input first, the basic conditions including the material and the plate thickness of work 108 to be cut, the type of the assist gas, teaching data (teaching) on the cutting track of work 108, and the tilt angle of laser machining head 103. Specifically, cutting condition setting device 106 of control unit 120 receive these basic conditions input on input unit 112 (step S111: basic condition input step). Although it is not described in step S111, the basic conditions include also the type of the condensing lens. These input basic conditions are stored in memory 110 of controller 105. In this case, the basic conditions may be stored temporarily in memory 110.

Processor 111 of controller 105 of control unit 120 checks the basic conditions for a section between adjacent teaching points on the cutting track against a machining condition table group stored in memory 110, and selects a plurality of machining condition tables (machining condition table group) in which the cutting speed and the laser power output are changed at each teaching point (step S112: machining table selection step). In machining condition tables stored in memory 110, the cutting speed and the laser power output are set by the procedure shown in the flowchart of FIG. 7. In this exemplary embodiment, however, it is not necessary that the extent of the overlap between the usable range of the cutting speed and the effective range of the cutting speed and the laser power output be equal to or larger than the given range. It is also not necessary that the laser power output for the maximum cutting speed defined in the approximation expressed as equation (1) be used. For example, a laser power output value larger than a laser power output value defined by the approximation may be used if the former laser power output value is within the effective range. An amount of variation of the cutting speed and the laser power output and a number of data used are determined properly and may be changed when necessary.

Subsequently, processor 111 creates a sub-table shown in FIG. 12. Specifically, processor 111 calculates a cutting time and power used for cutting (which will hereinafter be referred to as "power for cutting") between the adjacent teaching points, for each of the machining condition tables selected at step S112. Processor 111 then associates the calculated cutting time and power for cutting with the machining condition table for which the calculation is made, to create a sub-table (step S113: sub-table creating step). As shown in FIG. 12, sub-tables are created respectively for tables included in the machining condition table group that are selected at step S112, and these sub-tables are grouped into a sub-table group for each pair of teaching points.

Subsequently, processor 111 creates a navigation table shown in FIG. 13. Specifically, processor 111 selects one sub-table from each of sub-table groups each created for each pair of teaching points at step S113. Processor 111 then calculates a cutting time required for cutting along the whole cutting track (which will hereinafter be referred to as "total cutting time") and power used for cutting along the whole cutting track (which will hereinafter be referred to as "total power consumption for cutting"), for a combination of selected sub-tables. Further, processor 111 compiles combinations of selected sub-tables to create one navigation table (step S114: navigation table creating step). By making different selections of sub-tables from sub-table groups each created for each pair of teaching points, processor 111 prepares a plurality of combinations of sub-tables and creates a navigation table for each of them. Hence a navigation table group is created. A method of selecting a sub-table from each sub-table group created for each pair of teaching points is determined properly and may be changed when necessary. It is preferable that a number of navigation tables making up a navigation table group be a number of navigation tables that the operator can select at step S116 (which will be described later), which, for example, ranges from 3 to 5. It may be possible that combinations of sub-tables different in data on total cutting times are prepared and navigation tables are created for them, or that combinations of sub-tables different in data on total power consumption for cutting are prepared and navigation tables are created for them. It may also be possible that combinations of sub-tables different in data on total cutting times and data on total power consumption for cutting are prepared and navigation tables are created for them.

FIG. 13 shows a cutting track having three teaching points including a cutting start point (teaching point No. 0), that is, teaching point No. 0, teaching point No. 1, and teaching point No. 2. FIG. 13 shows an example in which sub-table No. 11 is selected for a section between teaching point No. 0 and teaching point No. 1 while sub-table No. 21 is selected for a section between teaching point No. 1 and teaching point No. 2, and navigation table No. 11 is created for a combination of sub-table No. 11 and sub-table No. 21. In navigation table No. 11, the shape of work 108 in the section between teaching point No. 0 and teaching point No. 1 is different from the same in the section between teaching point No. 1 and teaching point No. 2. In response to this condition, the tilt angle θ of laser machining head 103 is determined to be 0 degree in the section between teaching point No. 0 and teaching point No. 1 and to be +20 degrees in the section between teaching point No. 1 and teaching point No. 2. As indicated in FIG. 13, results of checks of the cut surface shape of work 108 may be extracted from machining condition tables used for creating a navigation table and be added to the navigation table.

For each navigation table created at step S114, the navigation table making up the navigation table group, processor 111 displays data included in the navigation table, such as initial conditions, machining condition groups 1 to 3, a total cutting time, and a total power consumption for cutting, on the display 113 (step S115). Processor 111 displays also a result of check of the cut surface shape of work 108 when necessary. However, displaying all kinds of data is unnecessary. Types of data to be displayed are determined properly and are changed when necessary. Form of displaying data on display 113 is determined arbitrarily. However, for example, graphing cutting speeds, laser power outputs, and results of checks of the cut surface shape all together, as shown in FIGS. 3 and 4, is considered to be a form understandable to the operator.

Referring to data from navigation tables displayed at step S115, the operator selects a navigation table appropriate for specifications on cutting of work 108. Thus, machining conditions to be actually used are determined. Specifically, cutting condition setting device 106 receives input of a selected navigation table through input unit 112 (step S116: navigation table selecting step).

Then, based on the determined machining conditions, processor 111 then controls operations of laser machining robot 130 and laser oscillator 102 so that work 108 is cut (step S117: cutting step).

Step S116 will be further described, using a specific example shown in FIG. 14. As shown in FIG. 14, the operator first inputs desired conditions on input unit 112 (see "1. Operator's desired conditions"). In this example, the operator inputs a cut surface shape, a total cutting time, and total power consumption for cutting. A required finished condition of the cut surface shape is input as "Good (G)", which indicates that the finishing condition is good across the whole cutting track, and/or "Fair (F)", which indicates that the finishing condition is hardly determined to be "Good" or "No good (NG)". A desired range of the total cutting time and that of the total power consumption for cutting are also input, respectively. Input of the required finished condition of the cut surface shape may be changed for each teaching point. For example, in a case where the cutting track is complicated, such as one that meanders on a curved surface, only "Good" is input as the required finished condition of the cut surface shape. In a case of linear cutting of a thick plate in which higher cutting speed is first priority, the required finished condition of the cut surface shape of a section to be cut between teaching points may be input as "Fair".

According to input conditions, processor 111 of controller 105 selects a plurality of navigation tables corresponding to the conditions, as usable navigation table candidates, and causes display 113 to display contents of the selected navigation tables (see "2. Display usable navigation table candidates"). In this example, three candidates (Nos. 11, 13, 17) are displayed. Out of these candidates, the operator selects a navigation table (see 3. Select navigation table No.). In this example, navigation table No. 13 is selected. This selection determines machining conditions for laser cutting, and cutting is executed according to the determined machining conditions.

As described above, the laser cutting method according to this exemplary embodiment is achieved by adding the following steps to the laser cutting methods according to the first and second exemplary embodiments. At the machining condition table selecting step (step S72 of FIG. 7) described in the first exemplary embodiment, the basic conditions for laser cutting of a section between adjacent two teaching points on the whole cutting track of work 108 are checked against the machining condition table group to select a plurality of combinations of machining condition tables corresponding to laser cutting of a desired form (step S112 of FIG. 11).

The laser cutting method according to this exemplary embodiment further includes the sub-table creating step (step S113 of FIG. 11) of associating a cutting time and power for cutting, which are required for cutting the section between the two teaching points, with a machining condition table to create a sub-table, the navigation table creating step (step S114 of FIG. 11) of associating a total cutting time and total power consumption for cutting, which are totals of time and power spent for cutting along the whole cutting track, with each of combinations of sub-tables to create a plurality of navigation tables, and the navigation table selecting step (step S116 of FIG. 11) of selecting a navigation table used for laser cutting, from the plurality of navigation tables, according to desired specifications for laser cutting. At the cutting step described in this exemplary embodiment (step S117 of FIG. 11), work 108 is cut, based on machining conditions included in the navigation table selected at the navigation table selecting step.

According to the laser cutting method of this exemplary embodiment, laser cutting conditions can be set easily in the same manner as by the laser cutting methods of the first and second exemplary embodiments. In addition, laser cutting device 101 is allowed to have a large operation margin while maintaining desired machining quality, thus being able to perform stable laser cutting.

Further, according to the laser cutting method of this exemplary embodiment, when it is necessary to perform laser cutting of work 108 while considering factors other than the cut surface shape, such as the total cutting time and the total power consumption for cutting, to be important factors, required specifications concerning these factors are specified. This allows the user to easily select a desired navigation table from a plurality of navigation tables stored in memory 110 and set machining conditions.

The navigation table to be used is selected based on at least one of the total cutting time, the total power consumption for cutting, and the result of check of the cut surface shape of work 108. The navigation table may be selected so that required specifications concerning these factors are all met.

According to this exemplary embodiment, basic conditions are checked, a machining condition table is checked, and a sub-table is created for cutting in a section between adjacent teaching points on the cutting track. The laser cutting method is, however, not limited to this. The above steps may be executed as a section between two teaching points located across a given gap is specified as a section to be cut.

If processor 111 or a combination of processor 111 and an external server (not depicted) connected thereto is configured to have a learning function, processor 111 and the like may be caused to gain sufficient learning experience in advance. By this procedure, selection of a combination of machining condition tables at step S112 and selection of a combination of sub-tables at step S114 can be made in a short time with better accuracy.

At step S116, the operator selects a navigation table to be used. The navigation table, however, may be selected through a calculation process by processor 111. In this case, if processor 111 is configured to have a learning function, selection of the navigation table to be used can be made in a short time with better accuracy.

INDUSTRIAL APPLICABILITY

The laser cutting device and laser cutting method according to the present invention make machining condition setting easy, and are therefore usable in industrial applications.

REFERENCE MARKS IN THE DRAWINGS

101: laser cutting device
102: laser oscillator
103: laser machining head
104: manipulator
105: controller
106: cutting condition setting device (teaching pendant)
107: transmission fiber
108: work
109: laser beam
110: memory
111: processor
112: input unit
113: display
120: control unit
130: laser machining robot
θ: tilt angle
θs: sidewise tilt angle

The invention claimed is:

1. A laser cutting device for cutting a workpiece by emitting a laser beam output from a laser oscillator onto the workpiece via a transmission fiber and a laser machining head fitted to a front end of a laser machining robot, the laser cutting device comprising:
a control unit,
wherein:
the laser machining robot has a predetermined speed range in which the laser machining robot is allowed to move with a given tracking accuracy, and a usable range of a cutting speed of cutting the workpiece is set based on the predetermined speed range;
the control unit includes a memory storing a plurality of machining condition tables including data on cutting conditions;
each of the plurality of machining condition tables includes, as parameters associated with a material of the workpiece and a plate thickness of the workpiece, at least a laser oscillation frequency, a laser power output, a laser power output duty, the usable range of the cutting speed, an effective range demarcated by the cutting speed and the laser power output that are set so that a cut surface of the workpiece meets given finishing conditions, and an approximation of a lower boundary of the effective range; and
the control unit is configured to:
(i) select a first machining condition table of the plurality of machining condition tables stored in the memory so that the cutting speed and the laser power output meet given conditions;
(ii) control operations of the laser machining robot and the laser oscillator so that the workpiece is cut based on the first machining condition table;
(iii) change at least either of the laser oscillation frequency or the laser power output duty when an extent of an overlap between the effective range and the usable range of the cutting speed is smaller than a given range, the effective range and the usable range of the cutting speed being included in the first machining condition table; and select a second machining condition table of the plurality of machining condition tables so that the extent of the overlap between the effective range and the usable range of the cutting speed becomes equal to or larger than the given range; and
(iv) control operations of the laser machining robot and the laser oscillator so that the workpiece is cut based on the second machining condition table.

2. The laser cutting device according to claim 1, wherein:
the parameters included in each of the plurality of machining condition tables are also associated with a tilt angle of the laser machining head against a direction of cutting of the workpiece; and
the control unit is configured to control operations of the laser machining robot and the laser oscillator so that the workpiece is cut by the laser machining head in an advance position in which a front end of the laser machining head is located ahead of a rear end of the laser machining head in the direction of cutting of the workpiece and the tilt angle is 0 degrees or more and 30 degrees or less.

3. A laser cutting method of laser cutting a workpiece by emitting a laser beam output from a laser oscillator onto the workpiece, the laser oscillator being controlled by a control unit, via a transmission fiber and a laser machining head fitted to a front end of a laser machining robot controlled by the control unit, the laser cutting method comprising:
a basic condition input step of receiving input of basic conditions applied at execution of the laser cutting, the basic conditions including a material of the workpiece and a plate thickness of the workpiece;
a machining condition table selecting step of checking the basic conditions input at the basic condition input step against a machining condition table group stored in a memory included in the control unit, the machining condition table group including a plurality of machining condition tables including various parameters on the laser cutting, to select a first machining condition table of the plurality of machining condition tables, the first machining condition table corresponding to the laser cutting of a desired form;
a machining condition setting step of setting machining conditions for the laser cutting, based on the first machining condition table;
a cutting speed judging step of judging whether a cutting speed of cutting the workpiece is within a usable range set based on a speed range determined in advance for the laser machining robot or judging whether an extent of an overlap between an effective range and the usable range of the cutting speed is equal to or larger than a given range, the effective range being demarcated by the cutting speed and a laser power output that are set so that a cut surface of the workpiece meets given finishing conditions;
a first cutting step of controlling operations of the laser machining robot and the laser oscillator to cut the workpiece based on a result of a judgment made at the cutting speed judging step;
a machining condition table reselecting step of changing at least either of a laser oscillation frequency or a laser power output duty when the extent of the overlap between the effective range and the usable range of the cutting speed is smaller than the given range, and selecting a second machining condition table of the plurality of machining condition tables; and a second cutting step of controlling operations of the laser machining robot and the laser oscillator to cut the workpiece based on the second machining condition table.

4. The laser cutting method according to claim 3, further comprising:
a cutting speed setting step of setting the cutting speed as a maximum cutting speed that is a maximum in the usable range; and
a laser power output setting step of extracting an approximation of a laser power output lower limit value for the cutting speed recorded on the second machining condition table, and setting the laser power output for the maximum cutting speed defined in the approximation as the laser power output at the execution of the laser cutting,
wherein:
when a judgment made at the cutting speed judging step is affirmative, the workpiece is cut at the first cutting step, based on the machining conditions set at the machining condition setting step; and
the judgment made at the cutting speed judging step is negative, the workpiece is cut at the first cutting step, based on the cutting speed set at the cutting speed setting step and the laser power output set at the laser power output setting step.

5. The laser cutting method according to claim 3, wherein:
the basic conditions further include a tilt angle of the laser machining head against a direction of cutting of the workpiece;
the various parameters included in the each of the plurality of machining condition tables are associated with the tilt angle of the laser machining head against the direction of cutting of the workpiece; and
at the first cutting step, operations of the laser machining robot and the laser oscillator are controlled so that the workpiece is cut by the laser machining head in an advance position in which a front end of the laser machining head is located ahead of a rear end of the laser machining head in the direction of cutting of the workpiece and the tilt angle is 0 degrees or more and 30 degrees or less.

6. The laser cutting method according to claim 3,
wherein, at the machining condition table selecting step, along a whole of a cutting track of the workpiece, the basic conditions for the laser cutting in a section between two adjacent teaching points located across a given gap are checked against the machining condition table group to select combinations of the plurality of machining condition tables corresponding to the laser cutting of the desired form,
wherein the laser cutting method further comprises:
a sub-table creating step of associating a cutting time and power for cutting that are required for cutting the section between the two adjacent teaching points, with the first machining condition table to create sub-tables;
a navigation table creating step of associating a total cutting time and total power consumption for cutting that are totals of time and power required for cutting along the whole of the cutting track, with each of combinations of the sub-tables to create a plurality of navigation tables; and
a navigation table selecting step of selecting one of the plurality of navigation tables, according to desired specifications for the laser cutting, and
wherein, at the first cutting step, operations of the laser machining robot and the laser oscillator are controlled so that the workpiece is cut based on the machining conditions included in the one of the plurality of navigation tables.

7. The laser cutting method according to claim 6,
wherein, at the navigation table selecting step, the one of the plurality of navigation tables is selected based on at least one of the total cutting time, the total power consumption, or a result of check of a cut surface shape of the workpiece.

8. A laser cutting device for cutting a workpiece by emitting a laser beam output from a laser oscillator onto the workpiece via a transmission fiber and a laser machining head fitted to a front end of a laser machining robot, the laser cutting device comprising:
a control unit,
wherein:
the laser machining robot has a predetermined speed range in which the laser machining robot is allowed to move with a given tracking accuracy, and a usable range of a cutting speed of cutting the workpiece is set based on the predetermined speed range;
the control unit includes a memory storing a plurality of machining condition tables including data on cutting conditions;
each of the plurality of machining condition tables includes, as parameters associated with a material of the workpiece and a plate thickness of the workpiece, at least a laser oscillation frequency, a laser power output, a laser power output duty, the usable range of the cutting speed, an effective range demarcated by the cutting speed and the laser power output that are set so that a cut surface of the workpiece meets given finishing conditions, and an approximation of a lower boundary of the effective range, the approximation being that the laser power output is approximated by a quadratic equation of the cutting speed; and
the control unit is configured to select one of the plurality of machining condition tables stored in the memory so that the cutting speed and the laser power output meet given conditions, and control operations of the laser machining robot and the laser oscillator so that the workpiece is cut based on the one of the plurality of machining condition tables.

9. A laser cutting method of laser cutting a workpiece by emitting a laser beam output from a laser oscillator onto the workpiece, the laser oscillator being controlled by a control unit, via a transmission fiber and a laser machining head fitted to a front end of a laser machining robot controlled by the control unit, the laser cutting method comprising:
a basic condition input step of receiving input of basic conditions applied at execution of the laser cutting, the basic conditions including a material of the workpiece and a plate thickness of the workpiece;
a machining condition table selecting step of checking the basic conditions input at the basic condition input step against a machining condition table group stored in a memory included in the control unit, the machining condition table group including a plurality of machining condition tables including various parameters on the laser cutting, to select one of the plurality of machining condition tables which corresponds to the laser cutting of a desired form;
a machining condition setting step of setting machining conditions for the laser cutting, based on the one of the plurality of machining condition tables;

a cutting speed judging step of judging whether a cutting speed of cutting the workpiece meets given conditions under the machining conditions set at the machining condition setting step;

a cutting step of controlling operations of the laser machining robot and the laser oscillator to cut the workpiece based on a result of a judgment made at the cutting speed judging step; and wherein each of the plurality of machining condition tables includes an effective range demarcated by the cutting speed and a laser power output that are set so that a cut surface of the workpiece meets given finishing conditions, and an approximation of a lower boundary of the effective range, the approximation being that the laser power output is approximated by a quadratic equation of the cutting speed.

* * * * *